United States Patent
Hatsuda et al.

(10) Patent No.: US 6,562,879 B1
(45) Date of Patent: May 13, 2003

(54) WATER-ABSORBENT RESIN POWDER AND ITS PRODUCTION PROCESS AND USE

(75) Inventors: Takumi Hatsuda, Takasago (JP); Hiroyuki Ikeuchi, Himeji (JP); Koji Miyake, Okayama (JP); Yoshio Irie, Himeji (JP); Kunihiko Ishizaki, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/502,823

(22) Filed: Feb. 11, 2000

(30) Foreign Application Priority Data

Feb. 15, 1999 (JP) .......................................... 11-036407

(51) Int. Cl.$^7$ ................................................. C08J 9/16

(52) U.S. Cl. ...................... 521/56; 521/60; 528/502 F; 241/24.28; 241/25; 241/29; 241/30

(58) Field of Search ................... 521/56, 60; 528/502 F; 241/29, 24.28, 25, 30

(56) References Cited

U.S. PATENT DOCUMENTS

| | | | |
|---|---|---|---|
| 5,064,582 A | * 11/1991 | Sutton et al. ................. | 264/37 |
| 5,147,343 A | 9/1992 | Kellenberger ................ | 604/368 |
| 5,149,335 A | 9/1992 | Kellenberger et al. ....... | 604/372 |
| 5,385,983 A | 1/1995 | Graham ................... | 525/330.1 |
| 5,462,972 A | 10/1995 | Smith et al. ................. | 521/53 |
| 5,562,646 A | 10/1996 | Goldman et al. ........... | 604/368 |
| 5,601,542 A | 2/1997 | Melius et al. ............... | 604/368 |
| 5,684,106 A | 11/1997 | Johnson et al. ............. | 526/295 |
| 5,760,080 A | 6/1998 | Wada et al. ................. | 524/559 |
| 5,985,944 A | 11/1999 | Ishizaki et al. .............. | 521/64 |
| 6,040,088 A | 3/2000 | Bennett et al. ............. | 429/229 |

FOREIGN PATENT DOCUMENTS

| | | |
|---|---|---|
| EP | 0317106 | 5/1989 |
| EP | 0532002 | 3/1993 |
| EP | 0761241 | 3/1997 |
| EP | 0812873 | 12/1997 |
| EP | 0813905 | 12/1997 |
| EP | 0844270 | 5/1998 |
| EP | 0874002 | 10/1998 |
| EP | 0937739 | 8/1999 |
| GB | 2319788 | 6/1998 |
| JP | 1306403 | 11/1989 |
| WO | 9422940 | 10/1994 |

OTHER PUBLICATIONS

Merriam–Webster's Collegiate Dictionary, 10$^{th}$ ed.; Merriam–Webster, Incorporated: USA, 1999, p. 513.*

* cited by examiner

Primary Examiner—James J. Seidleck
Assistant Examiner—Melanie Bissett
(74) Attorney, Agent, or Firm—Roylance, Abrams, Berdo & Goodman, L.L.P.

(57) ABSTRACT

The present invention provides a water-absorbent resin powder and its production process and use, wherein the water-absorbent resin powder has high liquid permeability and high water absorbency. The production process for a water-absorbent resin powder, according to the present invention, comprises the step of obtaining water-absorbent crosslinked polymer particles by an aqueous solution polymerization step, and grinding the resultant crosslinked polymer particles until the bulk density thereof increases to not lower than 0.72 (g/ml). The water-absorbent resin powder is characterized by being arbitrarily pulverized and having a bulk density of not lower than 0.74 (g/ml) and a water absorption capacity of not lower than 20 (g/g) for 0.9 weight % physiological saline under a load of 0.7 psi (4.83 kPa). In addition, the absorbent structure comprises the above water-absorbent resin powder and a fibrous material. The absorbent article comprises an absorbent layer including the above absorbent structure.

23 Claims, 9 Drawing Sheets

WATER-ABSORBENT RESIN POWDER AND ITS PRODUCTION PROCESS AND USE

BACKGROUND OF THE INVENTION

A. Technical Field

The present invention relates to a water-absorbent resin powder and its production process and use.

B. Background Art

In recent years, water-absorbent resins (water-absorbing agents) are widely used as constituent materials of sanitary materials, such as disposable diapers, sanitary napkins, and so-called incontinent pads, for the purpose of causing the water-absorbent resins to absorb body fluids.

Known examples of the above water-absorbent resins are as follows: crosslinked polymers of partially neutralized polyacrylic acids; hydrolyzed products of starch-acrylic acid grafted polymers; saponified products of vinyl acetate-acrylic acid ester copolymers; hydrolyzed products of acrylonitrile- or acrylamide copolymers, and their crosslinked polymers; and crosslinked polymers of cationic monomers.

It is said that the above water-absorbent resins should, for example, have the following properties: upon contact with aqueous liquids such as body fluids, excellent water absorption quantity and rate, the gel strength, the suction power to suck up water from a base material containing aqueous liquids. In addition, a variety of water-absorbent resins or a variety of absorbent structures or articles using the water-absorbent resins are proposed, wherein the water-absorbent resins jointly have a plurality of the above properties and exhibit excellent performance (absorption properties) when used for sanitary materials such as disposable diapers and sanitary napkins.

Known examples of the above water-absorbent resins or absorbent structures or articles using the water-absorbent resins are as follows: a water-absorbent resin comprising combinations of a gel volume, a shear modulus, and an extractable polymer content as are specified (U.S. Pat. No. 4,654,039); a water-absorbent resin with a water absorption quantity, a water absorption rate, and a gel strength as are specified, and disposable diapers and sanitary napkins using this water-absorbent resin (JP-A-60-185550, JP-A-60-185551, JP-A-60-185804, and U.S. Pat. No. 4,666,975); disposable diapers using a water-absorbent resin having a specific water absorption quantity, a specific water absorption rate, and a gel stability (JP-A-60-185805); water-absorbent articles using a water-absorbent resin with a water absorption quantity, a suction power, and a water-soluble content as are specified (JP-A-63-021902); water-absorbent sanitary articles containing a water-absorbent resin with a water absorption quantity, a water absorption quantity under a load, and a gel fracture strength as are specified (JP-A-63-099861); disposable diapers containing a water-absorbent resin with a water absorption quantity and a water absorption rate under a load as are specified (JP-A-02-034167); a water-absorbent composite containing a water-absorbent resin with a water absorbency under a load (AUL) and a particle diameter as are specified (EP 339,461); an absorbent structure containing 60~100 weight % of a specific water-absorbent resin with a free swell rate (FSR) and a water absorbency under a load in 5 minutes as are specified (EP 443,627); a water-absorbent composite containing at least 30 weight % of water-absorbent resin with a deformation under a load (DUL) and a wicking index (WI) as are specified (EP 532,002); an absorbent article using 30~100 weight % of a water-absorbent resin with a pressure absorbency index (PAI) and a 16-hour extractability level as are regulated (EP 615,735); a water-absorbent composite of super-absorbent material with a specific water retention capacity, a specific water absorption rate, and a specific liquid permeability under a pressure (U.S. Pat. No. 5,985,944); a water-absorbing agent having a specific diffusing absorbency under pressure (U.S. Pat. No. 5,760,080); a water-absorbing composition having a specific diffusing absorbency index under pressure (EP 761,241); and an absorbent structure using a hydrogel that is, for example, characterized by performance under pressure (PUP) and physiological saline flow conductivity (SFC) (U.S. Pat. No. 5,562,646). In addition, water-absorbent resin powders have problems in that they undergo deterioration of the physical properties due to surface fracture when (air-)transported or incorporated into absorbent articles in process of production or thereafter. However, a water-absorbent resin which undergoes such deterioration of the physical properties little and has excellent impact resistance is also known (EP 812,873).

The properties relating to water absorbency (e.g. water absorption capacity under no load, water absorption capacity under a load) of absorbent structures or absorbent articles containing them, for which water-absorbent resins are used, are surely enhanced by adding the above various improvements to water-absorbent resins when compared with the unimproved properties, and thus such improvements are applied to superabsorbent disposable diapers and so on. However, the liquid permeability between particles of a gel resultant from water absorption of the resin, which is important for practical daily use, is still at an insufficient level, so it is difficult to say that the whole water-absorbent resin, which is contained in the absorbent article, is sufficiently made use of. Furthermore, in the case where an attempt is made to ensure the liquid permeability of the gel under a high load (e.g. 0.3 psi (2.07 kPa) corresponding to an infant's load), the crosslinking density of the gel needs to be increased at the sacrifice of the water absorbency.

SUMMARY OF THE INVENTION

A. OBJECTS OF THE INVENTION

An object of the present invention is to provide: a water-absorbent resin powder and its production process, wherein the water-absorbent resin powder has high liquid permeability under a load, and further, high water absorbency both under a load and under no load; and further, an absorbent structure and an absorbent article, for which this water-absorbent resin powder is used. Another object of the present invention is to provide a water-absorbent resin powder which undergoes little deterioration of the physical properties and has excellent impact resistance when (air-)transported or incorporated into absorbent articles in process of production or thereafter.

B. DISCLOSURE OF THE INVENTION

The present inventors diligently studied to achieve the above object. As a result, they thought that a cause of insufficient liquid permeability of conventional water absorbent resins was that because particles of such resins have an arbitrarily pulverized shape and therefore have angular or frilly portions in their surfaces, liquid-permeable spaces between particles are non-uniform in absorbent structures or articles which usually include from tens of thousands up to more than hundreds of thousands of the resin particles. The inventors further thought that the above angular or frilly portions of the particle surfaces are so weak as to deteriorate the impact resistance.

Then, it occurred to the inventors to grind the surfaces of the resin particles and then crosslink the surfaces of the resultant particles as a means of eliminating the above cause, and actually, the inventors ground the surfaces of the resin particles and then crosslinked the surfaces of the resultant particles, with the result that the inventors found that while the water absorbency was retained at a conventional level, the liquid permeability under a load was greatly enhanced when compared with conventional cases. In addition, the inventors found that a water-absorbent resin powder resultant from the surface grinding was the water-absorbent resin powder which underwent little deterioration of the physical properties and had excellent impact resistance when (air-) transported or incorporated into absorbent articles in process of production or thereafter. Furthermore, the inventors found that if the above process was used, a novel water absorbent resin powder having high water absorbency and high bulk density was obtainable. In addition, the inventors found that a water-absorbent resin powder, having the arbitrarily pulverized shape and a high bulk density, surprisingly had a rather enhanced liquid permeability between particles under a load in spite of having only a small quantity of spaces when packed. Thus, the present invention was completed.

That is to say, an arbitrarily pulverized water-absorbent resin powder, according to the present invention, is characterized by having a bulk density of not lower than 0.74 (g/ml) and a water absorption capacity of not lower than 20 (g/g) for 0.9 weight % physiological saline under a load of 0.7 psi (4.83 kPa).

An absorbent structure, according to the present invention, is characterized by comprising the above arbitrarily pulverized water-absorbent resin powder according to the present invention and a fibrous material.

An absorbent article, according to the present invention, is characterized by comprising an absorbent layer including the above absorbent structure according to the present invention.

Another absorbent article, according to the present invention, is characterized by being a diaper that comprises an absorbent layer including the above absorbent structure according to the present invention, wherein the absorbent structure has an arbitrarily pulverized water-absorbent resin powder content of not lower than 30 weight %.

A production process for an arbitrarily pulverized water-absorbent resin powder, according to the present invention, comprises the step of obtaining water-absorbent crosslinked polymer particles by way of an aqueous solution polymerization step, and is characterized by further comprising the step of grinding the resultant crosslinked polymer particles until the bulk density thereof increases to not lower than 0.72 (g/ml).

These and other objects and the advantages of the present invention will be more fully apparent from the following detailed disclosure.

DETAILED DESCRIPTION OF THE INVENTION

Figure 1:
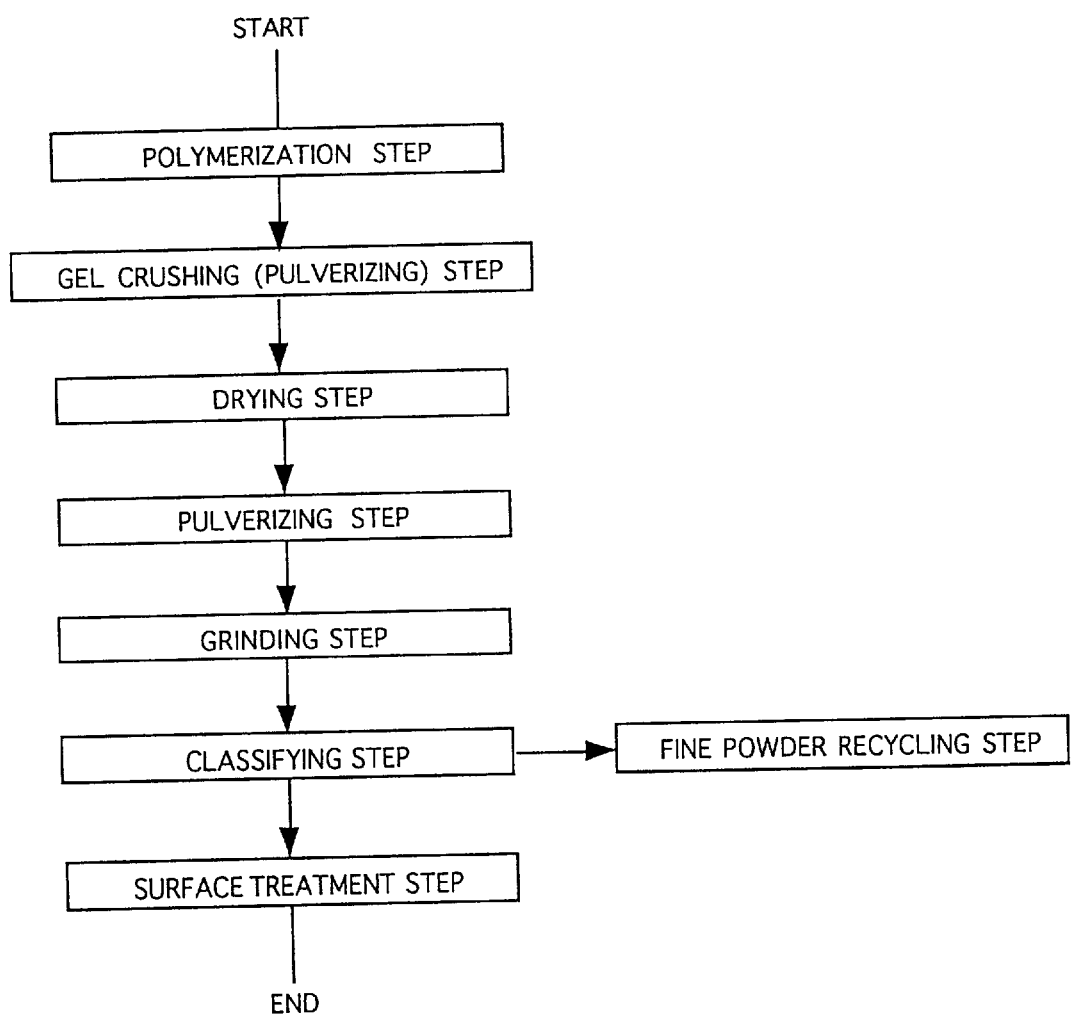
FIG. 1 is a flowchart of a typical example of the steps of the present invention production process for a water-absorbent resin powder.

Hereinafter, the present invention is explained in detail.
(Production Process for Water-absorbent Resin Powder):

An example of the steps of the production process for a water-absorbent resin powder according to the present invention is shown in FIG. 1. However, the steps of the production process for a water-absorbent resin powder according to the present invention is not limited thereto.

The production process for a water-absorbent resin powder, according to the present invention, comprises the step of obtaining water-absorbent crosslinked polymer particles by way of an aqueous solution polymerization step, and is characterized by further comprising the step of grinding (the surfaces of) the resultant crosslinked polymer particles until the bulk density thereof increases to not lower than 0.72 (g/ml).

Figure 2:
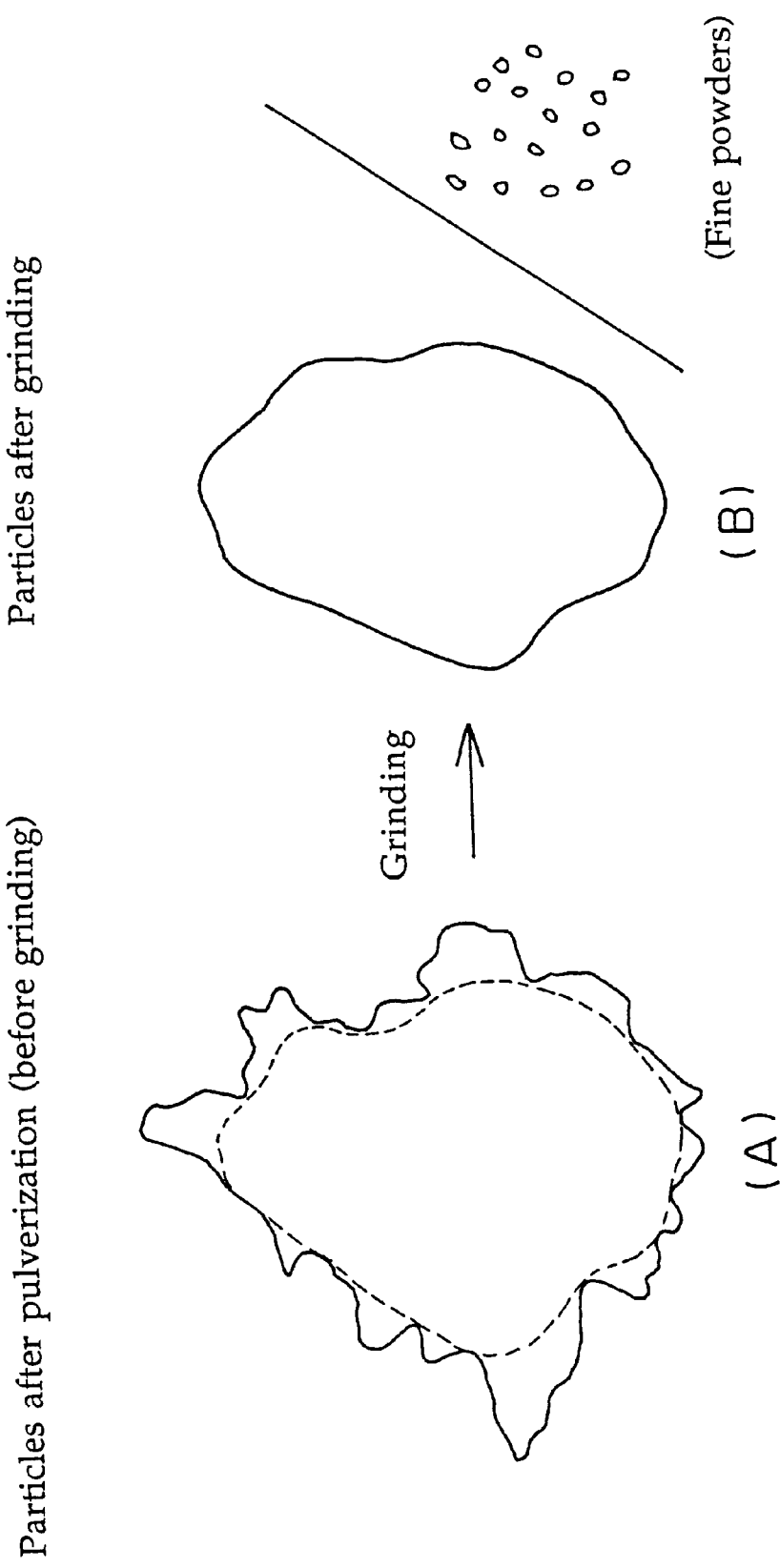
FIG. 2 is an image which illustrates (A) the shape of the resin powder after pulverization (before grinding) and (B) that after grinding in the present invention.

Incidentally, the water-absorbent resin powder according to the present invention is of the arbitrarily pulverized shape. This arbitrarily pulverized one is a water-absorbent resin powder that is obtained by pulverizing a gelled or dried product (preferably a dried product) of the crosslinked polymer that is obtained by way of the aqueous solution polymerization step, and this powder comprises pulverized particles of the arbitrary shape (in other words, irregular shape) (e.g. particles of the shape shown in (A) and (B) of FIG. 2). Incidentally, hereinafter, the arbitrarily pulverized water-absorbent resin powder is simply referred to as water-absorbent resin powder.

The aforementioned crosslinked polymer particles, which are used to produce the water-absorbent resin powder of the present invention, comprise a conventionally known crosslinked polymer that absorbs as large a quantity of water as 50~1,000 times the polymer itself in ion-exchanged water to thereby form an anionic, nonionic, or cationic hydrogel, or the aforementioned crosslinked polymer particles are products by drying (if necessary) the above polymer and usually pulverizing it before and/or after this drying. Examples of such crosslinked polymer include at least one member selected from the group consisting of: crosslinked polymers of partially neutralized polyacrylic acids; hydrolyzed products of starch-acrylonitrile grafted polymers; hydrolyzed products of starch-acrylic acid grafted polymers; saponified products of vinyl acetate-acrylic acid ester copolymers; hydrolyzed products of acrylonitrile- or acrylamide copolymers, or their crosslinked polymers; modified products of crosslinked polyvinyl alcohols containing a carboxyl group; and crosslinked isobutylene-maleic anhydride copolymers. These crosslinked polymers may be used either alone respectively or in combinations with each other, but, among them, one of those which have a carboxyl group or any mixture thereof is preferable, and typically, a polymer which is obtained by polymerizing and crosslinking monomers of which the main component is acrylic acid and/or a salt (neutralized product) thereof is used as the main component of the crosslinked polymer. In addition, as to the above-mentioned crosslinked polymer, those which have an uncrosslinked water-soluble content of preferably not higher than 20 weight %, more preferably not higher than 15 weight %, still more preferably not higher than 12 weight %, particularly preferably not higher than 10 weight %, are used.

Examples of the above salt of acrylic acid include: alkaline metal salts (e.g. salts of sodium, potassium, and lithium), ammonium salts, and amine salts of acrylic acid. The constituent units of the above-mentioned crosslinked polymer preferably comprise acrylic acid of 0~50 mol % and its salt of 100~50 mol %, and more preferably comprise acrylic acid of 10~40 mol % and its salt of 90~60 mol % (wherein the total of both is 100 mol %). The neutralization of the crosslinked polymer to form the above salt may be carried out either in a monomer state before polymerization or in a polymer state on the way of polymerization or thereafter, or in both states. However, the neutralization in a polymer state needs a considerably long time although such neutralization has the merit of lessening the extractable content. Therefore, in view of the production cost, it is preferable to carry out the neutralization in a monomer state before polymerization.

The monomers to give the crosslinked polymer as used in the present invention may further comprise monomers other than the above acrylic acid (and its salts), if necessary. The monomers other than acrylic acid (and its salts) are not especially limited, but specified examples of them include: anionic unsaturated monomers, such as methacrylic acid, maleic acid, vinylsulfonic acid, styrenesulfonic acid, 2-(meth)acrylamido-2-methylpropanesulfonic acid, 2-(meth)acryloylethanesulfonic acid, and 2-(meth)acryloylpropanesulfonic acid, and their salts; nonionic unsaturated monomers containing a hydrophilic group, such as acrylamide, methacrylamide, N-ethyl(meth)acrylamide, N-n-propyl(meth)acrylamide, N-isopropyl(meth)acrylamide, N,N-dimethyl(meth)acrylamide, 2-hydroxyethyl (meth)acrylate, 2-hydroxypropyl (meth)acrylate, methoxypolyethylene glycol (meth)acrylate, polyethylene glycol mono(meth)acrylate, vinylpyridine, N-vinylpyrrolidone, N-acryloylpiperidine, N-acryloylpyrrolidine, and N-vinylacetamide; cationic unsaturated monomers such as N,N-dimethylaminoethyl (meth)acrylate, N,N-diethylaminoethyl (meth)acrylate, N,N-dimethylaminopropyl (meth)acrylate, N,N-dimethylaminopropyl(meth)acrylamide, and their quaternary salts. These monomers may be used either alone respectively or in combinations with each other.

In the present invention, when the monomers other than acrylic acid (and its salts) are used, the ratio of them is preferably not higher than 30 mol %, more preferably not higher than 10 mol %, of the total with acrylic acid and its salts. If the above monomers other than acrylic acid (and its salts) are used in the above ratio, then the absorption properties of the finally resultant water-absorbent resin powder are still more improved, and the water-absorbent resin powder is obtainable at a still lower cost.

When the above monomer is polymerized to obtain the crosslinked polymer as used in the present invention, bulk polymerization and precipitation polymerization can be carried out. However, considering the performance, the easiness of the polymerization control, or the liquid permeability of a swollen gel, it is preferable to carry out aqueous solution polymerization using the above monomer in the form of its aqueous solution. Incidentally, when the monomer is used in the form of its aqueous solution, the concentration of the monomer in its aqueous solution (hereinafter referred to as "aqueous monomer solution") is not especially limited, but is preferably in the range of 10~70 weight %, more preferably 20~40 weight %. In addition, when the above aqueous solution polymerization is carried out, a solvent other than water may be jointly used if necessary, and the kind of the solvent as jointly used is not especially limited.

Examples of the method of the aqueous solution polymerization include: a method in which the aqueous monomer solution is polymerized in a double-arm type kneader while the resultant hydrogel is crushed (in another word, pulverized); and a method in which the aqueous monomer solution is supplied into a prescribed vessel or onto a moving belt and then polymerized, and the resultant gel is crushed with a tool such as a meat chopper.

When the above polymerization is initiated, the following radical polymerization initiators, for example, can be used: potassium persulfate, ammonium persulfate, sodium persulfate, t-butyl hydroperoxide, hydrogen peroxide, and 2,2'-azobis(2-arnidinopropane) dihydrochloride.

Furthermore, a redox initiator is also available by further using a reductant to promote decomposition of the above polymerization initiator and combining both with each other. Examples of the above reductant include: (bi)sulfurous acid salts such as sodium sulfite and sodium hydrogensulfite; L-ascorbic acid (or its salts); reducible metals (or their salts) such as ferrous salts; and amines. However, the reductant is not especially limited to them.

The amount of the above polymerization initiator as used is usually in the range of 0.001~2 mol %, preferably 0.01~0.1 mol %. In the case where the amount of the polymerization initiator is smaller than 0.001 mol %, there are disadvantages in that a large amount of monomers remain unreacted, so the amount of residual monomers in the resultant polymer increases. On the other hand, in the case where the amount of the polymerization initiator exceeds 2 mol %, there might be disadvantages in that the water-soluble content in the resultant polymer increases.

In addition, the polymerization reaction may be initiated by irradiating the reaction system with active energy rays, such as radiations, electron beam, and ultraviolet rays, or by the joint use of this irradiation and the above polymerization initiators. Incidentally, the reaction temperature in the above polymerization reaction is not especially limited, but is preferably in the range of 15~110° C., more preferably 20~90° C. In addition, the reaction time is not especially limited either and may fitly be set according to factors such as the respective kinds of the monomers and polymerization initiators and the reaction temperature.

The crosslinked polymer, as used in the present invention, may be a self-crosslinking type using no crosslinking agent, but preferable ones are those which are copolymerized or reacted with an internal-crosslinking agent having at least two polymerizable unsaturated groups or at least two reactive groups per molecule.

Specified examples of the above internal-crosslinking agent include: N,N-methylenebis(meth)acrylamide, (poly)ethylene glycol di(meth)acrylate, (poly)propylene glycol di(meth)acrylate, trimethylolpropane tri(meth)acrylate, glycerol tri(meth)acrylate, glycerol acrylate methacrylate, ethylene-oxide-modified trimethylolpropane tri(meth)acrylate, pentaerythritol hexa(meth)acrylate, triallyl cyanurate, triallyl isocyanurate, triallyl phosphate, triallylamine, poly(meth)allyloxyalkanes, (poly)ethylene glycol diglycidyl ether, glycerol diglycidyl ether, ethylene glycol, polyethylene glycol, propylene glycol, glycerol, pentaerythritol, ethylenediamine, ethylene carbonate, propylene carbonate, polyethylenimine, and glycidyl (meth) acrylate.

These internal-crosslinking agents may be used either alone respectively or in combinations with each other. In addition, these internal-crosslinking agents may be added to the reaction system either all at once or divisionally. When at least one kind or two or more kinds of internal-crosslinking agents are used, it is preferable to essentially use a compound with at least two polymerizable unsaturated groups in the polymerization step, considering the properties such as absorption properties of the finally resultant water-absorbent resin powder.

The amount of the above internal-crosslinking agent as used is preferably in the range of 0.005~2 mol %, more preferably 0.02~0.5 mol %, still more preferably 0.04~0.2 mol %, of the above monomers. In the respective cases where the amount of the internal-crosslinking agent is smaller than 0.005 mol % and where the amount of the internal-crosslinking agent exceeds 2 mol %, sufficient absorption properties might not be obtained.

When the crosslinking structure is introduced into internal portions of the polymer using the above internal-crosslinking agent, the internal-crosslinking agent may be added to the reaction system before or on the way of polymerization of the above monomers, or thereafter, or after neutralization.

Incidentally, in the above polymerization, the following materials may be added to the reaction system: various foaming agents such as carbonates (or hydrogencarbonates), carbon dioxide, azo compounds, and inert organic solvents; hydrophilic polymers such as starch, cellulose, their derivatives, polyvinyl alcohol, polyacrylic acid (or its salts), and crosslinked polymers of polyacrylic acid (or its salts); various surfactants; chelating agents; and chain transfer agents such as hypophosphorous acid (or its salts).

When the above-mentioned crosslinked polymer is a product by the aqueous solution polymerization and is a gel, namely, a hydrogelled crosslinked polymer, this crosslinked polymer is dried (if necessary) and usually pulverized before and/or after this drying, thus obtaining an arbitrarily pulverized crosslinked polymer.

The water content of the crosslinked polymer, usable in the present invention, is not especially limited, but is preferably in the range of 0.1~40 weight % (but not including 40 weight %), more preferably 0.2~20 weight %, still more preferably 0.5~10 weight %.

In addition, the particle diameter of the crosslinked polymer, usable in the production process according to the present invention, is usually in the range of 10~1,500 $\mu$m, preferably 10~1,000 $\mu$m, more preferably 50~800 $\mu$m, still more preferably 75~700 $\mu$m (but not including 75 $\mu$m), particularly preferably 150~600 $\mu$m (but not including 150 $\mu$m), on average.

Next, an explanation is made on the grinding of the aforementioned crosslinked polymer particles, wherein the grinding is a feature of the present invention production process for a water-absorbent resin powder.

An example of the shape of the water-absorbent resin powder which is obtained by the production process according to the present invention is shown in FIG. 2(B).

The "grinding" in the present invention is defined as a mechanical unit operation to reduce the specific surface area of the polymer particles by fracture or friction which is caused by applying the external force to the polymer particles. Accordingly, when a comparison is made in the same particle diameter distribution, the conception of the "grinding" is different from that of the "pulverization" which increases the specific surface area.

In addition, in other words, the "pulverization" in the present invention is defined as a mechanical operation to reduce the particle diameter of a gel resultant from aqueous solution polymerization (or preferably a solid substance as obtained by drying this gel) by fracture which is caused by applying the external force, such as chopping force (in other words, dividing force), to the above gel or solid substance, wherein the pulverization is mainly made throughout or inside the particles. In comparison therewith, the "grinding" in the present invention is defined as a mechanical operation to smooth surfaces of particles having angular or pointed portions, resultant from the pulverization, by eliminating convex portions from such particles, therefore the grinding is mainly made on surfaces of the particles. Then, the production process for a water-absorbent resin powder, according to the present invention, is characterized by comprising the step of grinding (surfaces of) the crosslinked polymer particles until the bulk density thereof increases to not lower than 0.72 (g/ml). Incidentally, the bulk density, as herein referred to, is defined as the bulk density of particles from which fine powders, as generated (scraped off) by grinding, has been removed. In addition, the removed fine powders may be recovered and then recycled, if necessary (e.g. refer to U.S. Pat. No. 4,950,692, U.S. Pat. No. 5,064,582, U.S. Pat. No. 5,264,495, U.S. Pat. No. 5,478,879, EP 812,873, EP 885,917, EP 844,270).

Incidentally, the fine powders, as herein referred to, are, for example, particles having particle diameters of not greater than a certain value, for example, 100 $\mu$m, preferably 150 $\mu$m, more preferably 212 $\mu$m. In addition, examples of methods to remove the fine powders include: a method which involves screening with sieves; and a method in which the fine powders are removed by utilizing a gas stream. Incidentally, when the fine powders are removed, the entire removal is difficult due to factors such as classification efficiency, therefore it is enough to remove usually not less than 50 weight %, preferably not less than 70 weight %, more preferably not less than 90 weight %, of the fine powders.

Figure 8:
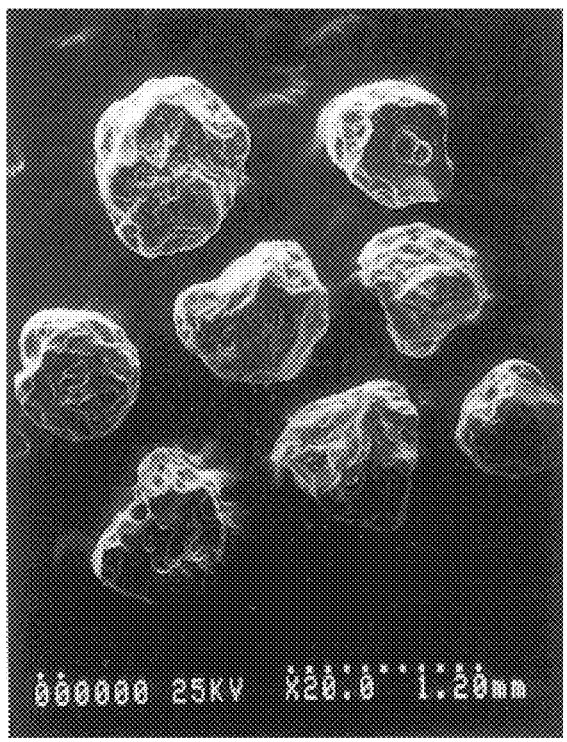
FIG. 8 is an electron micrograph showing the particle structure of a resin powder as obtained in Example 1.
Figure 9:
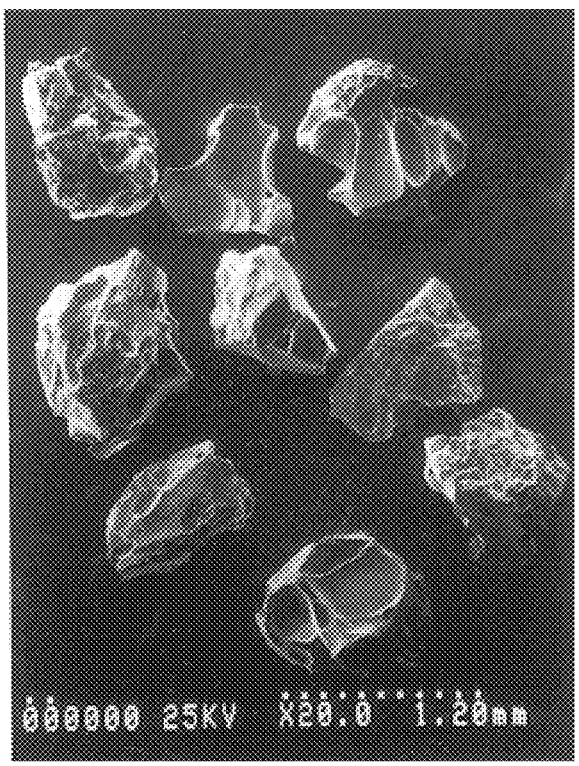
FIG. 9 is an electron micrograph showing the particle structure of a resin powder as obtained in Comparative Example 1.

In the present invention, the grinding is carried out to the crosslinked polymer particles as obtained by the aforementioned process, and it is preferable to carry out the below-mentioned surface treatment after the grinding. The particle shape of the crosslinked polymer particles resultant from the aforementioned process is an arbitrarily pulverized one, so the crosslinked polymer particles have angular or frilly portions (FIG. 2(A) and FIG. 9), and are formed into a comparatively roundish shape by the above grinding operation (FIG. 2(B) and FIG. 8).

Because the polymer particles become more rounded into a uniform shape by the grinding according to the present invention, the bulk density of the ground polymer is higher than that of the unground polymer, and is preferably not lower than 0.72 g/ml, and more preferably in the range of 0.72~0.95 g/ml, still more preferably 0.73~0.90 g/ml, yet still more preferably 0.74~0.90 g/ml, yet still more preferably 0.75~0.90 g/ml, yet still more preferably 0.76~0.90 g/ml, particularly preferably 0.78~0.90 g/ml, most preferably 0.79~0.90 g/ml. In the case where the bulk density of the ground polymer is lower than 0.72 g/ml, there are disadvantages in that the liquid permeability of the finally resultant absorbent structure or article is not a sufficiently enhanced one, and further in that the resistance of the resultant water-absorbent resin powder to the impact (process damage) is inferior. In addition, in the case where the bulk density of the ground polymer is higher than 0.95 g/ml, there is a possibility that it might be difficult to ensure liquid-permeable spaces between gels when swelling. Incidentally, the value of the bulk density in the present invention is measured in a state where the solid content of the polymer (based on the moisture content) is not lower than 95 weight %.

Incidentally, the bulk density (unit: g/ml) is a value per unit capacity of the total weight of a plurality of particles when packed in a vessel having a certain capacity. Then, because there are clearances (gaps) between particles when packed in the vessel, the value of the bulk density is lower than the "density" or "absolute specific gravity" (unit: $g/cm^3$), which is a value of the mass per unit volume of a particle, almost by the gaps.

In addition, the value of the bulk density is influenced by how to pack the particles (which of coarse (loose) packing and close (tapped) packing), and further, more or less, the value of the bulk density varies with the type of a measurement apparatus (bulk density meter).

Examples of the apparatus to measure the bulk density include those which are represented by JIS K-3362, JIS K-6721, ASTM D 1895-69, or edana APPARENT DENSITY 460, 1-99. The measured values with these apparatuses are not necessarily the same as each other, and therefore cannot generally be compared with each other. For example, a measured value with an apparatus which is represented by the above edana APPARENT DENSITY 460, 1-99 tends to be somewhat higher than a measured value with an apparatus which is used in the present invention (an apparatus which is represented by JIS K-3362). In addition, the measured value further varies with measurement conditions. For example, the measured value increases by giving a vibration or tapping the measurement apparatus when the water-absorbent resin powder is packed into a measurement vessel. In the present invention, the measurement is carried out without giving a vibration or tapping the measurement vessel in process of packing. A value, as determined with a measurement apparatus by a measurement method which are explained in the below-mentioned DETAILED DESCRIPTION OF THE PREFERRED EMBODIMENTS, is used as the value of the bulk density in the present invention.

Because the polymer particles become more rounded into a uniform shape by the grinding according to the present invention, the reduction of the average particle diameter (D50) of the ground polymer from that of the unground polymer is less than in the case of the pulverization, and is preferably not more than 40%, more preferably not more than 30%, still more preferably not more than 25%. The grinding to exceed 40% has the disadvantage, for example, of decelerating the water absorption rate or increasing the amount of the generation of fine powders.

The device which is used to carry out the grinding according to the present invention is not especially limited, but devices which can grind the particle surface by mechanically stirring the particles are preferable, and homogenizers or pin mills are particularly preferable for enabling the achievement of effective grinding, and more preferably, high-speed homogenizers are used. The homogenizer is usually a mixing device to form a suspension or emulsion from a two-phase system of solid-liquid or liquid-liquid, but, in the present invention, the homogenizer is found effective for the grinding of the crosslinked polymer particles.

For example, in the case where the crosslinked polymer is ground with the homogenizer in the present invention, the grinding is carried out at preferably 1,000~20,000 rpm, more preferably 3,000~10,000 rpm, for preferably 30 seconds~5 hours, more preferably 1 minute~3 hours, still more preferably 3 minutes~2 hours.

Because, as is aforementioned, the crosslinked polymer particles become more rounded into a uniform shape by the grinding according to the present invention, liquid-permeable spaces can so uniformly exist throughout the resin in absorbent structures or articles, including a plurality of the polymer particles, that the liquid permeability between particles (under a load) can be enhanced in spite of reduction of gaps between particles.

In addition, because, as is aforementioned, the bulk density (g/ml) of the water-absorbent resin powder is increased by the grinding according to the present invention, merits in the transportation can also be considered, for example, in that a vessel (bag) into which the resultant water-absorbent resin powder is placed can be compact, or in that a large amount of water-absorbent resin powder can be packed into an identical vessel.

Furthermore, because, as is aforementioned, the angular or frilly portions of the polymer particles is eliminated by the grinding according to the present invention, the damage (what is called process damage) of the resin for example due to collision between resin particles or between the resin and the device in the production process for the resin is lessened, so that the physical properties of the resin can be prevented from deteriorating due to this damage. In addition, not only the process damage, but also the damage of the resin during the transportation after production, or during the production of absorbent articles, or during the practical use (e.g. for disposable diapers) can be reduced, so the deterioration of the physical properties can be prevented. In addition, when compared with conventional particles (water-absorbent resin powder), the ground particles (water-absorbent resin powder) have better miscibility with surface-crosslinking agents, therefore merely form a smaller amount of lumps in the mixing step, therefore can be surface-crosslinked more uniformly, therefore give the resultant water-absorbent resin powder better absorption properties or higher process damage resistance.

The present invention production process for a water-absorbent resin powder, preferably, further comprises the step of carrying out a surface-crosslinking treatment by further mixing a surface-crosslinking agent with the crosslinked polymer particles (water-absorbent resin powder) resultant from the grinding treatment in the above way. The surface-crosslinking treatment is able to reduce the formation of fisheyes of particles when absorbing water or to improve the absorption properties under a load. Furthermore, the surface-crosslinking treatment of the crosslinked polymer (water-absorbent resin powder) resultant from the grinding treatment can enhance the liquid permeability under a load without damaging the absorption properties under a load.

Examples of the surface-crosslinking agent, usable in the present invention, include: polyhydric alcohol compounds such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerol, polyglycerol, glycerophosphoric acid, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymer, pentaerythritol and sorbitol; epoxy compounds such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether and glycidol; polyamine compounds, such as ethylenediamine, diethylenetriamine, triethylenetetramine, tetraethylenepentamine, pentaethylenehexamine and polyethylenimine, and their inorganic or organic salts (for example, azetidinium salts); polyisocyanate compounds such as 2,4-tolylene diisocyanate and hexamethylene diisocyanate; polyoxazoline compounds such as 1,2-ethylenebisoxazoline, polyisopropenyloxazoline, and copolymers thereof; alkylene carbonate compounds such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxan-2-one, 4-methyl-1,3-dioxan-2-one, 4,6-dimethyl-1,3-dioxan-2-one and 1,3-dioxopan-2-one; haloepoxy compounds, such as epichlorohydrin, epibromohydrin and α-methylepichlorohydrin, and their polyamine adducts (for example, Kymene made by Hercules: registered trademark); silane coupling agents such as γ-glycidoxypropyltrirethoxysilane and γ-aminopropyltriethoxysilane; and polyvalent metallic compounds such as hydroxides and chlorides of zinc, calcium, magnesium, aluminum, iron and zirconium. Among them, the polyhydric alcohols and the alkylene carbonate compounds are preferable in view of the safety in the case where the surface-crosslinking agent remains unreacted. Particularly preferable surface-crosslinking agents are those which include polyhydric alcohols.

These surface-crosslinking agents may be used either alone respectively or in combinations with each other. When at least two surface-crosslinking agents are used jointly with each other, a water-absorbent resin with still more excellent absorption properties is obtainable by combining a first and a second surface-crosslinking agent which have solubility parameters (SP values) different from each other. Incidentally, the above-mentioned solubility parameter is a value as commonly used as a factor showing the polarity of compounds.

The above-mentioned first surface-crosslinking agent is a compound which is reactive upon a carboxyl group of the crosslinked polymer (water-absorbent resin powder) and has a solubility parameter of not less than 12.5 $(cal/cm^3)^{1/2}$ (25.6 $(J/m^3)^{1/2}$). Examples of the first surface-crosslinking agent include ethylene glycol, propylene glycol, glycerol, ethylene carbonate, and propylene carbonate. The above-mentioned second surface-crosslinking agent is a compound which is reactive upon a carboxyl group of the crosslinked polymer (water-absorbent resin powder) and has a solubility parameter less than 12.5 $(cal/cm^3)^{1/2}$ (25.6 $(J/m^3)^{1/2}$). Examples of the second surface-crosslinking agent include glycerol polyglycidyl ether, (poly)glycerol polyglycidyl ether, ethylene glycol diglycidyl ether, 1,3-propanediol, trimethyloipropane, 1,3-propanediol, 1,6-hexanediol, diethylene glycol, triethylene glycol, tetraethylene glycol, and 1,4-butanediol.

The amount of the surface-crosslinking agent, as used if necessary for the crosslinked polymer (water-absorbent resin powder) resultant from the grinding treatment in the present invention, depends on factors such as combinations of the crosslinked polymer (water-absorbent resin powder) and the surface-crosslinking agent, but is usually in the range of 0.005~10 weight parts, preferably 0.05~5 weight parts, per 100 weight parts of the crosslinked polymer (water-absorbent resin powder) standing in a dry state. In the case where the above first surface-crosslinking agent is jointly used with the above second surface-crosslinking agent, the amount of the first surface-crosslinking agent as used is in the range of preferably 0.01~8 weight parts, more preferably 0.1~5 weight parts, and the amount of the second surface-crosslinking agent as used is in the range of preferably 0.001~1 weight parts, more preferably 0.005~0.5 weight parts. If the surface-crosslinking agent is used in the above range, the absorption properties for body fluids (aqueous liquids) such as urine, sweat and menstrual blood can be still more improved. In the case where the amount of the surface-crosslinking agent as used is smaller than 0.005 weight part, the crosslinking density in the neighborhood of the surface of the crosslinked polymer (water-absorbent resin powder) can hardly be raised, and the absorption properties might not be improved. In addition, in the case where the amount of the surface-crosslinking agent as used exceeds 10 weight parts, the surface-crosslinking agent is excessive, and this is uneconomical, and further, it might be difficult to control the crosslinking density to a proper value, so the water absorption capacity might not be improved.

In the present invention, it is preferable to use water when the crosslinked polymer (water-absorbent resin powder) resultant from the grinding treatment is mixed with the surface-crosslinking agent. The amount of water, as used then, is different according to the kind, particle diameter, or water content of the crosslinked polymer (water-absorbent resin powder), but is usually in the range of 0.5~10 weight parts, preferably 0.5~3 weight parts, per 100 weight parts of the solid content of the crosslinked polymer (water-absorbent resin powder). In the case where the amount of water as used exceeds 10 weight %, the water absorption capacity might be decreased. In the case where the amount is smaller than 0.5 weight %, there is a possibility that the water absorption capacity under a load could not be improved.

In addition, in the present invention, a hydrophilic organic solvent may be used in the case where the crosslinked polymer (water-absorbent resin powder) is mixed with the surface-crosslinking agent. Examples of the usable hydrophilic organic solvent include: alcohols such as methyl alcohol, ethyl alcohol, propyl alcohol, isopropyl alcohol, butyl alcohol, isobutyl alcohol, t-butyl alcohol, and propylene glycol; ketones such as acetone; ethers such as dioxane, alkoxy(poly)ethylene glycol, and tetrahydrofuran; amides such as N,N-dimethylformamide; and sulfoxides such as dimethyl sulfoxide. The amount of the organic solvent as used is different according to the kind or particle diameter of the crosslinked polymer (water-absorbent resin powder), but is usually in the range of 0~10 weight parts, preferably 0~5 weight parts, more preferably 0.1~5 weight parts, per 100 weight parts of the crosslinked polymer (water-absorbent resin powder).

In the present invention, the mixing of the crosslinked polymer (water-absorbent resin powder) with the surface-crosslinking agent may be carried out in a state where the crosslinked polymer (water-absorbent resin powder) is dispersed in organic solvents such as cyclohexane and pentane. However, examples of processes therefor include a process comprising the steps of: mixing the surface-crosslinking agent with water and/or the hydrophilic organic solvent if necessary; and then spraying or dropping the resultant mixture to the crosslinked polymer (water-absorbent resin powder), thereby mixing them. Spraying is preferable for such a process, and the size of liquid drops to be sprayed is preferably not larger than 300 μm, more preferably not larger than 200 μm. A water-insoluble finely particulate powder or a surfactant may be allowed to coexist when water is used for mixing.

The mixing apparatus favorable for the above mixing needs to be able to generate a great mixing force to ensure the uniform mixing. Preferable examples of the mixing apparatus, usable in the present invention, include: cylinder type mixers, double-wall cone type mixers, high-speed agitation type mixers, V-character-shaped mixers, ribbon type mixers, screw type mixers, fluidized-furnace rotary disk type mixers, gas current type mixers, double-arm type kneaders, internal mixers, pulverizing type kneaders, rotary mixers, and screw type extruders.

In the present invention production process for a water-absorbent resin powder, the crosslinked polymer (water-absorbent resin powder) resultant from the grinding treatment is preferably mixed with the surface-crosslinking agent, and then the neighborhood of the surface of the water-absorbent resin powder is crosslinked, when a heat treatment is carried out if necessary.

When the heat treatment is carried out in the present invention, the treatment period of time is preferably in the range of 1~180 minutes, more preferably 3~120 minutes, still more preferably 5~100 minutes. The treatment temperature is preferably in the range of 80~250° C., more preferably 100~210° C., still more preferably 120~200°C. The heating temperature lower than 80° C. might not only lengthen the heat treatment time and therefore deteriorate the productivity, but also hinder the uniform crosslinking from being achieved and therefore disable the production of the excellent water-absorbent resin powder. In addition, in the case where the treatment temperature is higher than 250° C., the resultant water-absorbent-resin powder might be damaged, so it might be difficult to obtain what has excellent water absorption capacity.

The heat treatment can be carried out using conventional dryers or heating-furnaces, and examples thereof include: channel type mixing dryers, rotary dryers, disk dryers, fluidized-bed dryers, gas-stream type dryers, and infrared dryers.

The above surface-crosslinking treatment gives a water-absorbent resin powder having a water absorption capacity of preferably not lower than 20 (g/g), more preferably not lower than 23 (g/g), still more preferably not lower than 25 (g/g), yet still more preferably not lower than 27 (g/g), particularly preferably not lower than 28 (g/g), for 0.9 weight % physiological saline under a load of 0.7 psi (4.83 kPa). Incidentally, the above physical property is that of a water-absorbent resin powder which has not yet undergone the below-mentioned mechanical damage test. Unlike conventional ones, however, the water-absorbent resin powder according to the present invention is excellent in terms of keeping the above physical property, or deteriorating it little, even after having undergone mechanical damage.

If necessary, the above production process for a water-absorbent resin powder, according to the present invention, may further comprise the step of giving various functions to the water-absorbent resin powder by adding thereto, for example, the following materials: deodorants; antimicrobial agents; perfumes; inorganic fine powders such as silicon dioxide and titanium oxide; foaming agents; pigments; dyes; hydrophilic short fibers; plasticizers; pressure sensitive adhesives; surfactants; manure; oxidants; reductants; water; salts; chelating agents; fungicides; hydrophilic polymers such as polyethylene glycol and polyethylenimine; hydrophobic polymers such as paraffins; thermoplastic resins such as polyethylene and polypropylene; and thermosetting resins such as polyester resins and urea resins.

(Water-absorbent Resin Powder):

The arbitrarily pulverized water-absorbent resin powder, according to the present invention, is characterized by having a bulk density of not lower than 0.74 (g/ml) and a water absorption capacity of not lower than 20 (g/g) for 0.9 weight % physiological saline under a load of 0.7 psi (4.83 kPa), and is, for example, obtainable by the aforementioned production process according to the present invention, but is not limited by this production process.

As to conventional arbitrarily pulverized water-absorbent resin powders, no other but has a bulk density of lower than 0.74 (g/ml) has been disclosed so far in the case where it has a water absorption capacity of not lower than 20 (g/g) for 0.9 weight % physiological saline under a load of 0.7 psi (4.83 kPa). Therefore, the aforementioned arbitrarily pulverized water-absorbent resin powder according to the present invention is a novel resin. If the bulk density is not lower than 0.74 (g/ml), liquid-permeable spaces are so uniformly distributed throughout the resin that the liquid permeability can be enhanced. On the other hand, a water-absorbent resin resultant from reversed-phase suspension polymerization, which has a comparatively small particle diameter or is spherical, is difficult to fix to pulp and is therefore unsuitable for absorbent articles, and further, this water-absorbent resin tends to be in the form of closest packing, so the quantity of liquid-permeable space portions between particles is too small, and the liquid permeability (under a load) is therefore low. Accordingly, the aforementioned water-absorbent resin powder according to the present invention is a resin which can provide improved results with regard to both performances of the water absorbency and the liquid permeability (under a load). So far, to ensure the liquid permeability of a gel under a high load, the absorption properties has needed to be sacrificed by increasing the crosslinking density of the gel or adding an additive, while the liquid permeability has been sacrificed to ensure high absorption properties (water absorption capacity), therefore it has been difficult to ensure both the water absorbency and the liquid permeability (under a load). However, the water-absorbent resin powder according to the present invention enables it.

In addition, if the bulk density is not lower than 0.74 (g/ml), there are also merits in the transportation, for example, in that a vessel (bag) into which the resultant water-absorbent resin powder is placed can be compact. Furthermore, there are merits in that excessive unevenness of the resin particles is so little that the process damage or the damage which the resin particles undergo in practical use is little when the resin is conveyed in the production steps of the water-absorbent resin powder or when diapers are produced. Incidentally, in the present invention it has been found that the increase of the bulk density to not lower than 0.74 (g/ml) further has the unexpected merit of decreasing the water-soluble content of the water-absorbent resin powder.

The bulk density of the arbitrarily pulverized water-absorbent resin powder according to the present invention is preferably not lower than 0.75 (g/ml), more preferably not lower than 0.76 (g/ml), still more preferably not lower than 0.78 (g/ml), particularly preferably not lower than 0.79 (g/ml), in view of better liquid permeability under a load and less process damage. In addition, the upper limit of the bulk density is preferably not higher than 0.95 (g/ml), and more preferably not higher than 0.90 (g/ml). In the case where the upper limit exceeds 0.95 (g/ml), there are disadvantages in that the liquid permeability (under a load) might be rather deteriorated, because the particles are too closely packed.

The liquid permeability under a load of 0.3 psi (2.07 kPa) is a liquid permeability between particles of the water-absorbent resin powder in consideration of an infant's weight as applied to absorbent articles such as diapers. It has been found that such a liquid permeability under a load of 0.3 psi (2.07 kPa) is, however, not achieved by water-absorbent resin powders which merely have high water absorption capacity under the load of 0.3 psi (2.07 kPa).

Incidentally, water-absorbent resin powders having a water absorption capacity of not lower than 20 (g/g) under the load of 0.3 psi (2.07 kPa) and water-absorbent resin powders (as have undergone the pulverization step) having a bulk density in the range from about 0.4 up to about 0.7 (g/ml) have been known so far (for example, water-absorbent resin powders having a bulk density in the range of 0.40~0.46 (g/ml) are disclosed in the working example portion of JP-A-61-200102). In general, however, the water absorption capacity under a load decreases in proportion as the load increases. Therefore, even if a water-absorbent resin powder has high water absorption capacity under a load of 0.3 psi (2.07 kPa), this water-absorbent resin powder does not necessarily have high water absorption capacity under a load of 0.7 psi (4.83 kPa). Even if water-absorbent resin powders have the same water absorption capacity under a load of 0.3 psi, they exhibit different values under a load of 0.7 psi due to factors such as their production processes or polymeric structures.

To improve the liquid permeability under a load of 0.3 psi (2.07 kPa), thus, the present inventors enhanced the water absorption capacity of a water-absorbent resin powder under a load of 0.7 psi (4.83 kPa), and further, enhanced the bulk density of the resin powder, thereby achieved the above object. That is to say, in the present invention, grinding (surfaces of) the crosslinked polymer by the aforementioned method enhances the bulk density of a water-absorbent resin powder to a higher value than conventional ones, and further, enhances the water absorption capacity of the resin powder under a load of 0.7 psi (4.83 kPa) to a higher value than conventional ones, thereby can achieve the improvement upon the liquid permeability under a load of 0.3 psi (2.07 kPa) and further can reduce the process damage to the water-absorbent resin powder.

In addition, the water absorption capacity of the arbitrarily pulverized water-absorbent resin powder according to the present invention is preferably not lower than 23 (g/g), more preferably not lower than 25 (g/g), still more preferably not lower than 27 (g/g), particularly preferably not lower than 28 (g/g), for 0.9 weight % physiological saline under a load of 0.7 psi (4.83 kPa). Incidentally, the above physical property is that of a water-absorbent resin powder which has not yet undergone the below-mentioned mechanical damage test. Unlike conventional ones, however, the water-absorbent resin powder according to the present invention is excellent in terms of keeping the above physical property, or deteriorating it little, even after having undergone mechanical damage.

By the same reason as mentioned in the preceding explanation of the production process, the arbitrarily pulverized water-absorbent resin powder according to the present invention is preferably that of which the neighborhood of the surface is crosslinked, and further, this crosslinking is preferably made with a surface-crosslinking agent that includes a polyhydric alcohol. Specifications, for example, the type of the surface-crosslinking agent or the method for the surface-crosslinking, are the same as aforementioned.

The average particle diameter of the water-absorbent resin powder which is provided by the present invention is preferably in the range of 150~600 μm, more preferably 300~600 μm. In addition, the content of fine powders having a particle diameter of not larger than 150 μm is usually not higher than 10 weight %, preferably not higher than 5 weight %, of the whole water-absorbent resin powder.

The arbitrarily pulverized water-absorbent resin powder, according to the present invention, further has an L value of preferably not lower than 85 in lightness (lightness index), and an a value preferably in the range of ±2 and a b value preferably in the range of 0~9 both in chromaticity (chromaticness index), as measured with a device such as a spectroscopic color difference meter. In the case where the L-, a-, or b value deviates from the above range, brown coloring tends to be seen on the surface of the water-absorbent resin powder, particularly, when the water-absorbent resin concentration (weight %) in the absorbent structure is high, particles of the water-absorbent resin might be seen in the form of yellowed spots in the absorbent structure, so such a case is not favorable to consumers. The above lightness or chromaticity is determined by factors such as raw materials (e.g. monomers, initiators), purity thereof, or production conditions (e.g. heating temperature or time), but, usually, the aforementioned conditions according to the present invention may fitly be used.

The arbitrarily pulverized water-absorbent resin powder, according to the present invention, or the water-absorbent resin powder as obtained by the production process, according to the present invention, undergoes little deterioration of the physical properties due to the process damage (mechanical damage), and exhibits a water absorption capacity of preferably not lower than 25 (g/g), more preferably not lower than 30 (g/g), still more preferably not lower than 35 (g/g), after a mechanical damage test (which is explained in the below-mentioned DETAILED DESCRIPTION OF THE PREFERRED EMBODIMENTS). In addition, the water-soluble content is in the same range as aforementioned, namely, preferably not higher than 20 weight %, more preferably not higher than 15 weight %, still more preferably not higher than 12 weight %, yet still more preferably not higher than 10 weight %.

(Absorbent Structure):

The absorbent structure, according to the present invention, is characterized by comprising the aforementioned arbitrarily pulverized water-absorbent resin powder according to the present invention and a fibrous material such as a hydrophilic fiber. In the case where the absorbent structure, for example, comprises the water-absorbent resin powder and the hydrophilic fiber, a constitution of the absorbent structure comprising a homogeneous mixture of the water-absorbent resin powder and the hydrophilic fiber is, for example, preferable for sufficiently displaying effects of the present invention. In this case, the weight ratio of the water-absorbent resin powder to the hydrophilic fiber is in the range of usually 20:80~90:10, preferably 30:70~90:10, more preferably 40:60~80:20, still more preferably 50:50~80:20. Because the water-absorbent resin powder according to the present invention has a ground surface and excellent liquid permeability, it is preferable for allowing the water-absorbent resin powder to display its features at the maximum that the ratio of the water-absorbent resin powder is preferably not lower than 30 weight %, more preferably not lower than 40 weight %. Examples of such include: a constitution comprising a homogeneous mixture of the water-absorbent resin powder and the hydrophilic fiber; a constitution comprising a layer of a homogeneous mixture of the water-absorbent resin powder and the hydrophilic fiber and a layer of the hydrophilic fiber as laminated on the preceding layer; a constitution comprising a layer of a homogeneous mixture of the water-absorbent resin powder and the hydrophilic fiber, a layer of the hydrophilic fiber, and the water-absorbent resin powder as interposed between these layers; and further a constitution comprising the water-absorbent resin powder as interposed between layers of the hydrophilic fiber; and still further a constitution comprising a sheet of the water-absorbent resin powder as shaped by combining a specific amount of water with the water-absorbent resin powder. Incidentally, the constitution of the absorbent structure is not limited to the above-mentioned examples thereof.

Examples of the above-mentioned fibrous material include hydrophilic fibers such as: cellulose fibers, for example, mechanical pulp, chemical pulp, semichemical pulp, digested pulp, as obtained from wood; and artificial cellulose fibers, for example, rayon, acetates. Among the above-exemplified fibers, cellulose fibers are preferable. In addition, the hydrophilic fibers may comprise synthetic fibers such as polyamides, polyesters, and polyolefins. Incidentally, the fibrous material is not limited to the above-exemplified fibers.

In addition, in the case where the ratio of the fibrous material such as the hydrophilic fiber in the absorbent structure is relatively small, the absorbent structures, namely, the hydrophilic fibers, may be allowed to adhere together using adhesive binders. If the hydrophilic fibers are allowed to adhere together, the strength and the shape retainability of the absorbent structure before or during the use thereof can be enhanced.

Examples of the above-mentioned adhesive binders include: heat-sealable fibers such as polyolefin fibers (e.g., polyethylene, polypropylene, ethylene-propylene copolymers, 1-butene-ethylene copolymers); and adhesive emulsions. These adhesive binders may be used either alone respectively or in combinations with each other. The weight ratio of the hydrophilic fiber and the adhesive binder is preferably in the range of 50/50 to 99/1, more preferably 70/30 to 95/5, still more preferably 80/20 to 95/5.

Because the absorbent structure according to the present invention is produced using the aforementioned water-absorbent resin powder according to the present invention wherein the resin powder is strong to the process damage, the physical properties are little deteriorated even in the production process for the absorbent structure, so the effects of the water-absorbent resin powder according to the present invention, such as achievement of both high absorbency and high liquid permeability, can be exhibited even in the absorbent structure.

(Absorbent Article):

The absorbent article, according to the present invention, is characterized by comprising an absorbent layer including the aforementioned absorbent structure according to the present invention.

In the absorbent article of the present invention, preferably an absorbent layer including the above-mentioned absorbent structure is interposed between a liquid-permeable surface sheet and a liquid-impermeable back sheet, but it is permissible that a diffusion layer, helping a liquid diffuse and, for example, comprising nonwoven fabrics, cellulose, or crosslinked cellulose, is put on the upper face of the absorbent layer or on the back or upper face of the surface sheet.

Because the absorbent article of the present invention comprises the absorbent layer including the absorbent structure of the above-mentioned constitution, this absorbent article has excellent water absorption properties as well as excellent liquid permeability as mentioned above. Specified examples of the absorbent article include sanitary materials such as disposable diapers, sanitary napkins, and so-called incontinence pads, but is not especially limited. Because the absorbent article has excellent water absorption properties and excellent liquid permeability, it can prevent urine from leaking and can afford so-called dry feeling in the case where the absorbent article is, for example, a disposable diaper. Particularly when the absorbent article according to the present invention is a diaper, it is preferable for achieving the satisfactory performances of the diaper excellent in liquid permeability that the absorbent article comprises an absorbent layer including the absorbent structure according to the present invention, and that the absorbent structure has an arbitrarily pulverized water-absorbent resin powder content of not lower than 30 weight %, more preferably not lower than 40 weight %, still more preferably not lower than 50 weight %, particularly preferably not lower than 60 weight %.

The above-mentioned sheet with liquid permeability (hereinafter referred to as liquid-permeable sheet) comprises a material that is permeable with aqueous liquids. Examples of the material forming the liquid-permeable sheet include: nonwoven fabrics, woven fabrics; porous synthetic resin films of polyethylene, polypropylene, polyester, polyamide. The above-mentioned sheet with liquid impermeability (hereinafter referred to as liquid-impermeable sheet) comprises a material that is impermeable with aqueous liquids. Examples of the material forming the liquid-impermeable sheet include: synthetic resin films of polyethylene, polypropylene, ethylene vinyl acetate, polyvinyl chloride; films of combined materials of these synthetic resins with nonwoven fabrics; films of combined materials of the above-mentioned synthetic resins with woven fabrics. Incidentally, the liquid-impermeable sheet may be permeable with vapor.

The constitution of the absorbent layer is not especially limited if it has the above-mentioned absorbent structure. In addition, the process for producing the absorbent layer is not especially limited. Furthermore, the method for interposing the absorbent layer between the liquid-permeable sheet and the liquid-impermeable sheet, namely, the process for producing the absorbent article, is not especially limited.

Incidentally, it is permissible to afford various functions to the absorbent structure or article by further adding materials, such as deodorants, perfumes, various inorganic powders, foaming agents, pigments, dyes, hydrophilic short fibers, fertilizers, oxidants, reductants, chelating agents, water, and salts, to the above-mentioned absorbent structure.

Because the absorbent article according to the present invention comprises the absorbent structure as produced using the aforementioned water-absorbent resin powder according to the present invention, this absorbent article can provide the effects, which the water-absorbent resin powder according to the present invention has, such as achievement of both high absorbency and high liquid permeability.

(Effects and Advantages of the Invention):

The production process for a water-absorbent resin powder, according to the present invention, greatly enhances the liquid permeability while retaining the water absorbency at a conventional high level in comparison with conventional processes, and further, strengthens the resistance to the mechanical damage. In addition, the water absorbent resin powder, as obtained by the production process according to the present invention, is a novel resin powder having high water absorbency and high bulk density.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to these examples. Incidentally, the performances of the polymer and the water-absorbent resin powder were measured by the below-mentioned methods.

In addition, in the case where the water-absorbent resin powder has absorbed the moisture due to factors such as distribution, preservation, or combination with absorbent articles, it is preferable that the measured values of the physical properties of the water-absorbent resin powder are corrected on the water content, if necessary. For example, in the case where the water content (based on the moisture content) of the water-absorbent resin powder is lower than 5 weight %, the measured values may be used as they are without the correction on the water content, but, in the case where the water content (based on the moisture content) is not lower than 5 weight % due to factors such as moisture absorption, it is preferable that the below-mentioned found values are corrected on the water content (e.g. 5 weight %) and then used, or that the water-absorbent resin powder which has absorbed the moisture is dried (for example, under vacuum in a wind-free drying oven of 60° C.) prior to the measurement.

(Water Absorption Capacity Under No Load):

First, 0.2 g of water-absorbent resin powder was uniformly placed into a nonwoven-fabric-made bag (60 mm×60 mm) and then immersed into 0.9 wt % physiological saline. Sixty minutes later, the bag was drawn up and then drained at 250 G for 3 minutes with a centrifuge, and the weight W1 (g) of the bag was then measured. On the other hand, the same procedure was carried out using no water-absorbent resin powder, and the resultant weight W0 (g) was measured. Thus, the water absorption capacity (g/g) under no load was calculated from these weights W1 and W0 in accordance with the following equation:

water absorption capacity (g/g) under no load=($W1$ (g) −$W0$ (g))/ (weight (g) of water-absorbent resin powder).

(Water Absorption Capacity Under Load):

Hereinafter, first, the measurement apparatus as used for measuring the water absorption capacity under a load is explained on the basis of FIG. 3.

Figure 3:
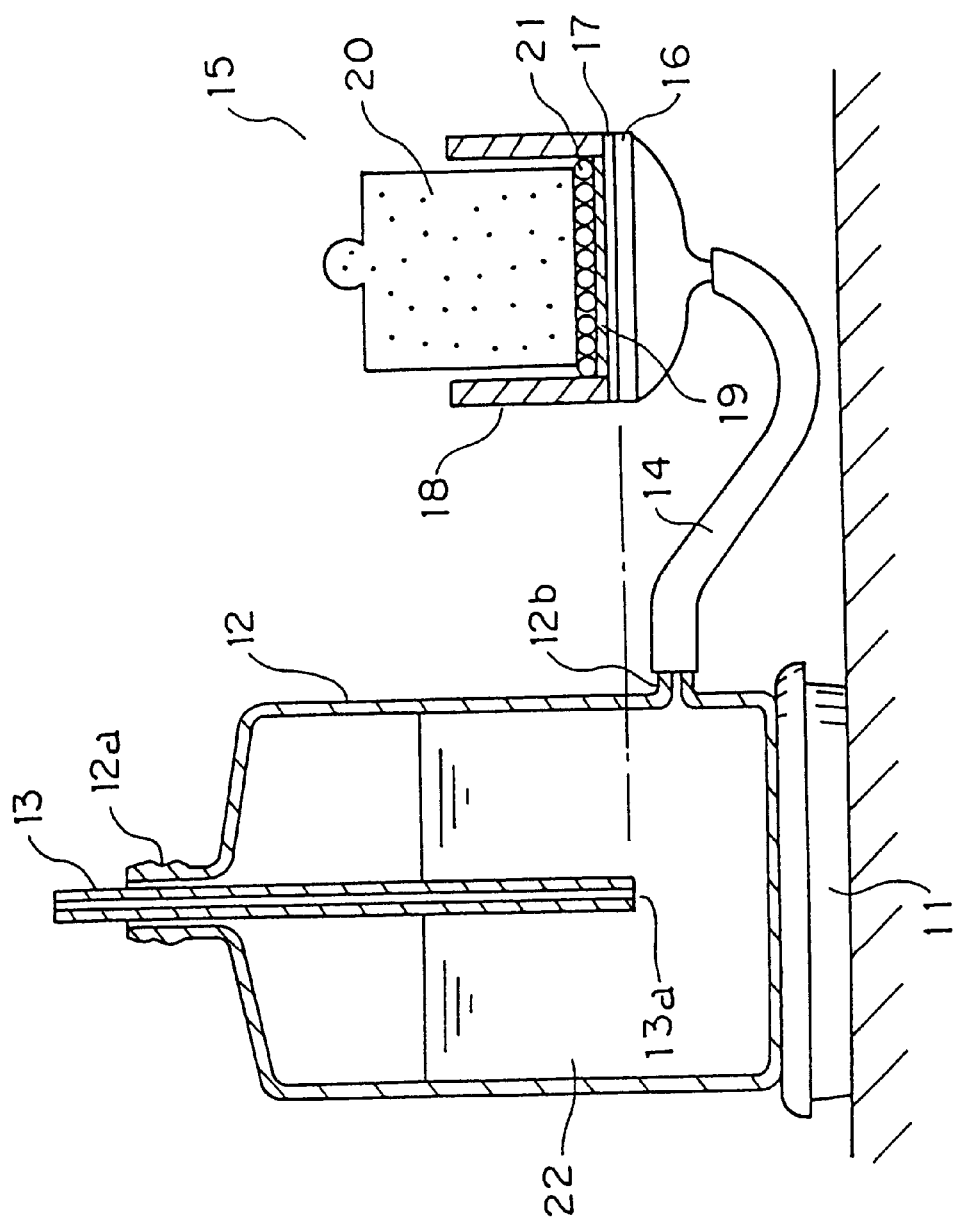
FIG. 3 is a schematic section of a measurement apparatus as used for measuring the water absorption capacity under a load.

As is shown in FIG. 3, the measurement apparatus comprises: a scale 11; a vessel 12 of a predetermined capacity as mounted on the scale 11; an air-inhaling pipe 13; an introducing tube 14; a glass filter 16; and a measurement part 15 as mounted on the glass filter 16.

The vessel 12 has an opening part 12a on the top and an opening part 12b on the side. The air-inhaling pipe 13 is inserted in the opening part 12a of the vessel 12, and the introducing tube 14 is fitted to the opening part 12b of the vessel 12.

In addition, the vessel 12 contains a predetermined amount of physiological saline 22. The lower end part of the air-inhaling pipe 13 is submerged in the physiological saline 22. The air-inhaling pipe 13 is set to keep the internal pressure of the vessel 12 nearly atmospheric. The glass filter 16 is formed in a diameter of 55 mm. The vessel 12 and the glass filter 16 are connected to each other through the introducing tube 14 made of silicone resin. In addition, the position and level of the glass filter 16 are fixed relative to the vessel 12.

The measurement part 15 comprises: filter paper 17; a supporting cylinder 18; a wire gauze 19 as attached to the bottom of the supporting cylinder 18; and a weight 20; and the measurement part 15 is formed by mounting the filter paper 17 and the supporting cylinder 18 (bottomed with the wire gauze 19) in this order on the glass filter 16 and further mounting the weight 20 inside the supporting cylinder 18, namely, on the wire gauze 19. The wire gauze 19 is made of stainless steel and formed in 400 mesh (mesh opening size: 38 μm). In addition, the level of the upper face of the wire gauze 19, namely, the level of the contact face of the wire gauze 19 with a water-absorbent resin powder 21, is set so as to be as high as the level of the lower end face 13a of the air-inhaling pipe 13. An arrangement is made such that a predetermined amount of water-absorbent resin powder having a predetermined particle diameter can uniformly be spread onto the wire gauze 19. The weight 20 is adjusted in weight such that a load of 0.7 psi (4.83 kPa) can uniformly be applied to the water-absorbent resin powder 21 on the wire gauze 19.

The water absorption capacity of the water-absorbent resin powder 21 under a load was measured with the measurement apparatus having the above-mentioned constitution. The measurement method is hereinafter explained.

First, predetermined preparatory operations were made, in which, for example, a predetermined amount of 0.9 wt % physiological saline 22 was placed into the vessel 12, and the air-inhaling pipe 13 was inserted into the vessel 12. Next, the filter paper 17 was mounted on the glass filter 16, and further, in parallel with this mounting operation, 0.9 g of water-absorbent resin powder was uniformly spread into the supporting cylinder 18, namely, onto the wire gauze 19, and the weight 20 was put on this water-absorbent resin powder 21.

Next, the wire gauze 19 (on which the water-absorbent resin powder 21 and the weight 20 were put) of the supporting cylinder 18 was mounted on the filter paper 17 such that the center line of the wire gauze 19 would conform with that of the glass filter 16.

Then, the weight (g) of the physiological saline 22, as absorbed by the water-absorbent resin powder 21 over a period of 60 minutes since the supporting cylinder 18 had been mounted on the filter paper 17, was determined from a value as measured with the scale 11.

In addition, the same procedure as the above was carried out using none of the water-absorbent resin powder 21, and the blank weight, namely, the weight (g) of the physiological saline 22, as absorbed by materials other than the water-absorbent resin powder 21, such as the filter paper 17, was determined from a value as measured with the scale 11 and regarded as the blank value. Next, a correction was made by subtracting the blank value, and the weight (g) of the physiological saline 22 as actually absorbed by the water-absorbent resin powder 21 was divided by the weight of the water-absorbent resin powder 21 (0.9 g), thus calculating the water absorption capacity (g/g) under the load.

Figure 4:
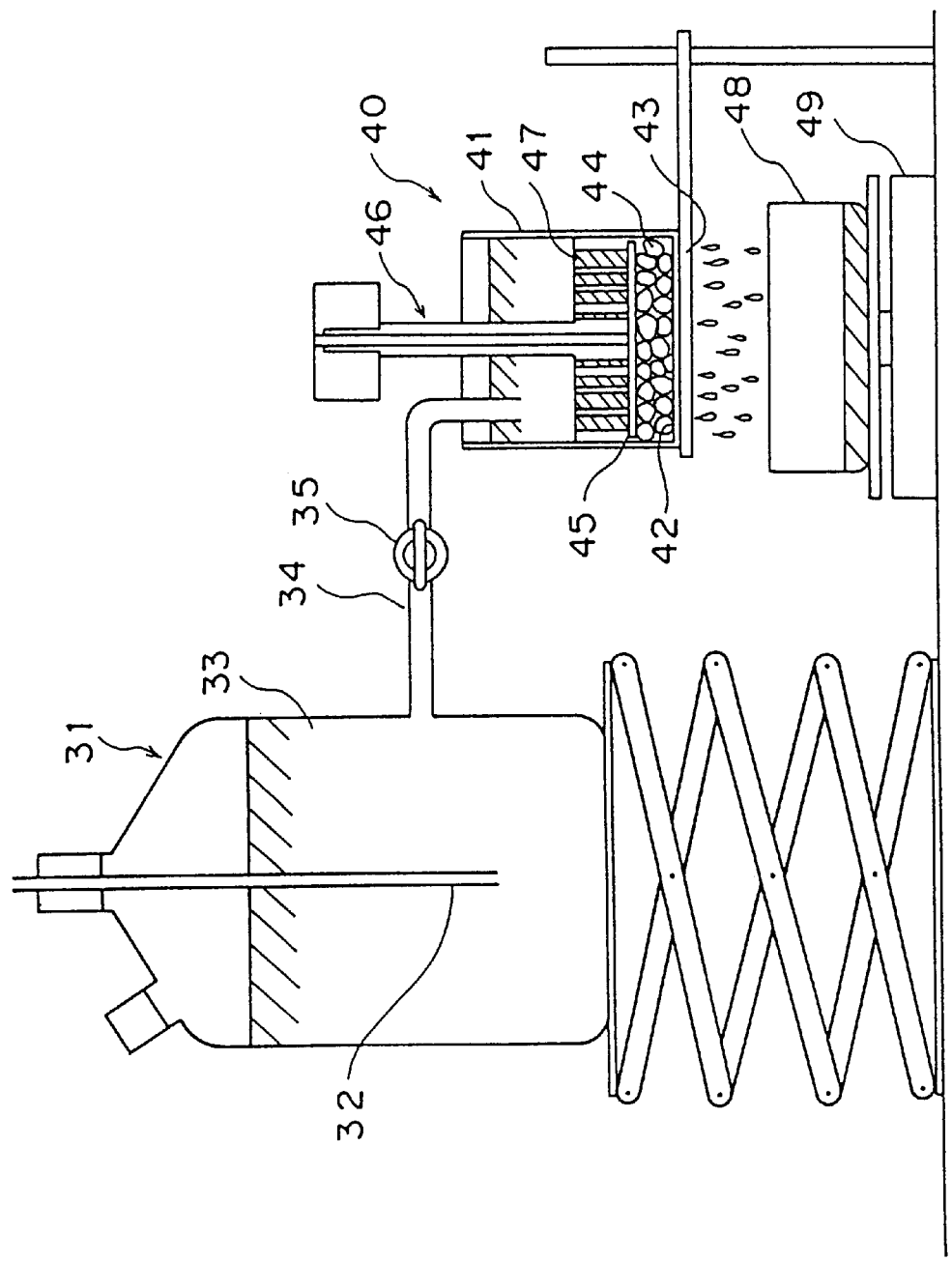
FIG. 4 is a schematic section of a measurement apparatus as used for measuring the liquid permeation amount under a load.

(Liquid Permeation Amount Under Load):

With an apparatus of FIG. 4 used, a water-absorbent resin powder (0.900 g) as uniformly put in a vessel 40 was swollen with artificial urine (1) under a load of 0.3 psi (2.07 kPa) for 60 minutes. Next, measurement was made on the amount (g) of 0.69 wt % aqueous sodium chloride solution 33 as passed through the resultant swollen gel 44 (mainly between particles thereof under a load of 0.3 psi (2.07 kPa) for 10 minutes.

As to the apparatus of FIG. 4, a glass tube 32 was inserted in a tank 31, and the lower end of the glass tube 32 was positioned such that the 0.69 wt % aqueous sodium chloride solution 33 could be maintained at the level of 5 cm above the bottom of the swollen gel 44 in a cell 41. The 0.69 wt % aqueous sodium chloride solution 33 in the tank 31 was supplied into the cell 41 through an L 34 having a cock.

Under the cell 41, there is a vessel 48 to collect the passed liquid, and this collecting vessel 48 was put on an even balance 49. The inner diameter of the cell 41 was 6 cm, and a No. 400 stainless wire gauze 42 (mesh opening size: 38 μm) was set at the bottom of a lower portion of the cell 41. A lower portion of a piston 46 had enough openings 47 for the liquid to pass through, and the bottom of the piston 46 is fitted with a glass filter 45 having so good permeability that the water-absorbent resin powder or a swollen gel thereof could not enter the openings 47. The cell 41 was put on a stand to support the cell, and a face of contact of the stand with the cell was set on a stainless wire gauze 43 that did not hinder the permeation of the liquid.

The measured value was obtained in a way that the amount (g) of the liquid that had flowed for 10 minutes since the cock 35 was opened was read from the even balance.

The artificial urine (1), which was used above, comprised 0.25 g of calcium chloride dihydrate, 2.0 g of potassium chloride, 0.50 g of magnesium chloride hexahydrate, 2.0 g of sodium sulfate, 0.85 g of ammonium dihydrogenphosphate, 0.15 g of diammonium hydrogenphosphate, and 994.25 g of pure water.

Figure 5:
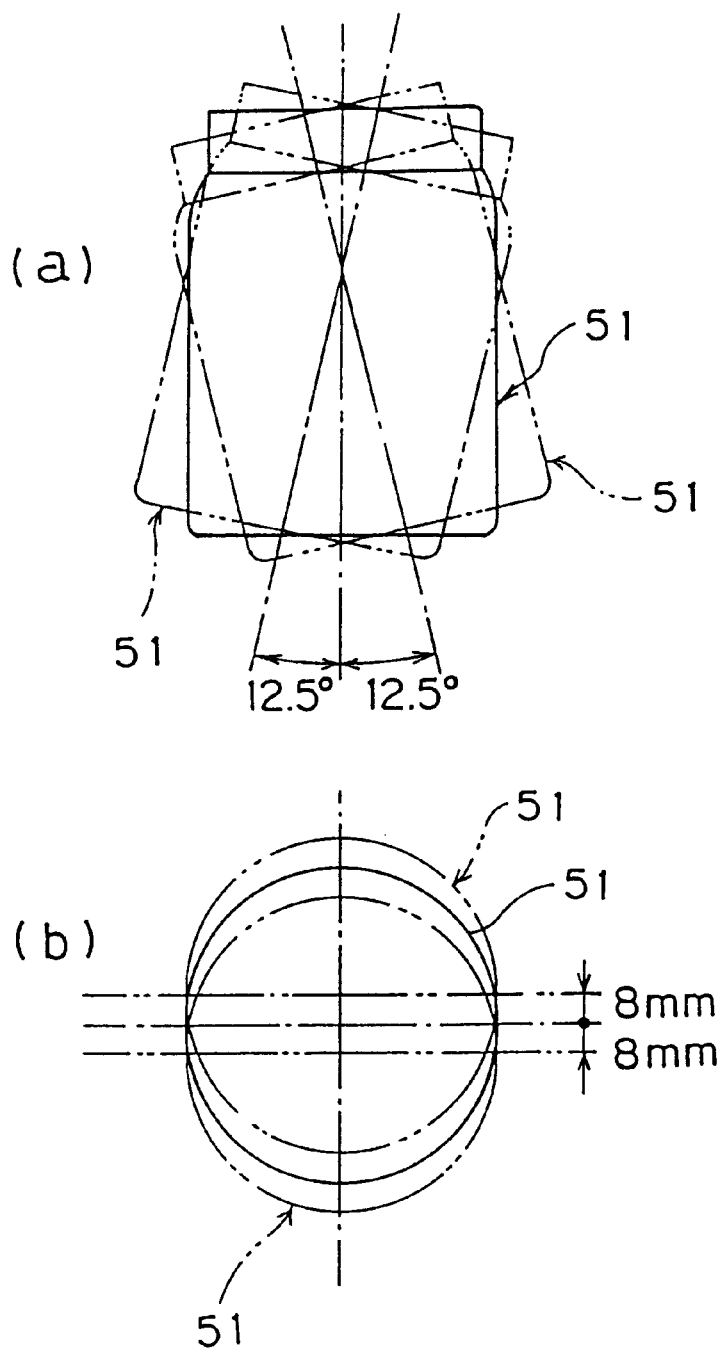
FIG. 5($a$) is a vertical schema and FIG. 5($b$) is a horizontal schema of a glass vessel as used for a mechanical damage test.
Figure 6:
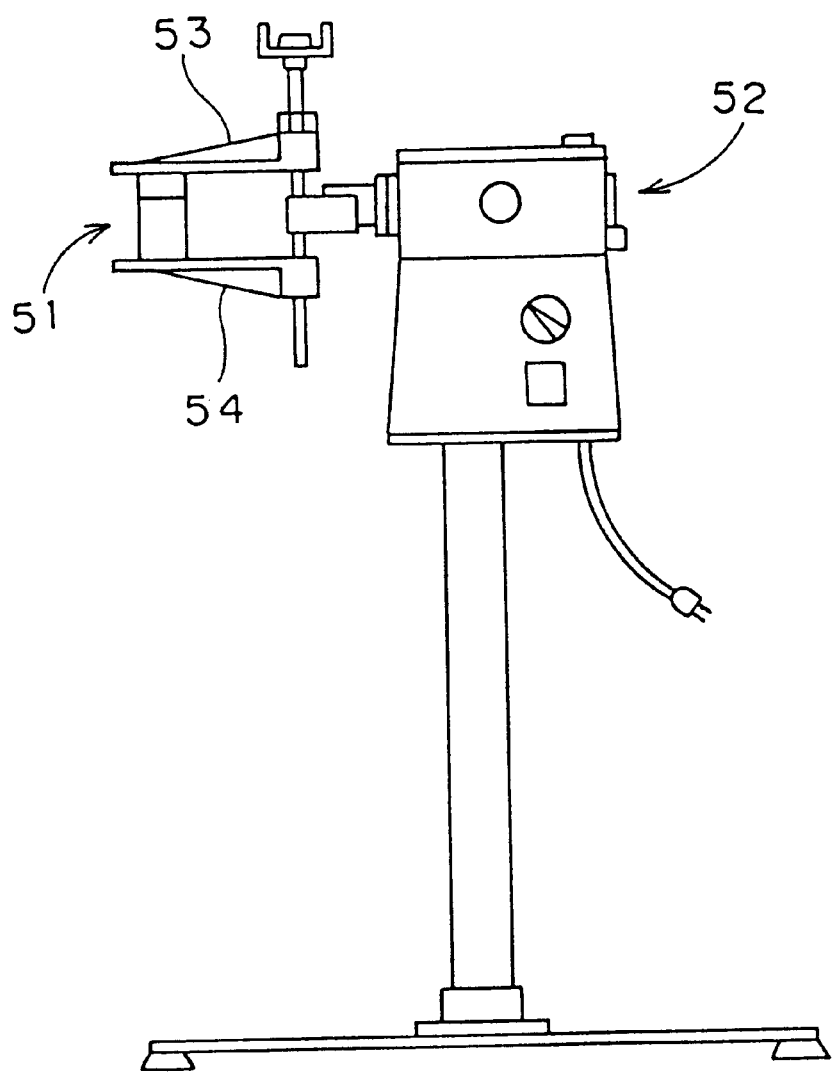
FIG. 6 is a schema of a dispersing machine as used for the mechanical damage test.

(Mechanical Damage Test):

An amount of 30 g of water-absorbent resin powder and 10 g of glass beads (soda-lime glass beads of about 6 mm in bead diameter for fractional distillation packing) were put into a glass vessel (trade name: A-29, mayonnaise bottle 51 made by Yamamura Glass K.K.) of FIG. 5. Then, this vessel was fixed by being put between clamps 53, 54 which were fitted to a dispersing machine 52 of FIG. 6 (No. 488 dispersing machine for test, made by Toyo Seiki Seisakusho K.K.), and a vibration of 750 cpm in vibration-rotation number was given to the vessel by 100 V/60 Hz for 30 minutes. Thereby, the vessel 51, which was fixed to the above dispersing machine 52, is moved right and left at a tilt angle of 12.5° each (total 25°), and simultaneously therewith vibrated back and forth by 8 mm each (total 16 mm), whereby the water-absorbent resin powder in the vessel is impacted upon.

The above impact is a force that is experientially defined as such representing the impact upon the water-absorbent resin powder in its production steps, but the above impact is widely applicable also to the damage during the transportation after production, or during the production of absorbent structures.

Figure 7:
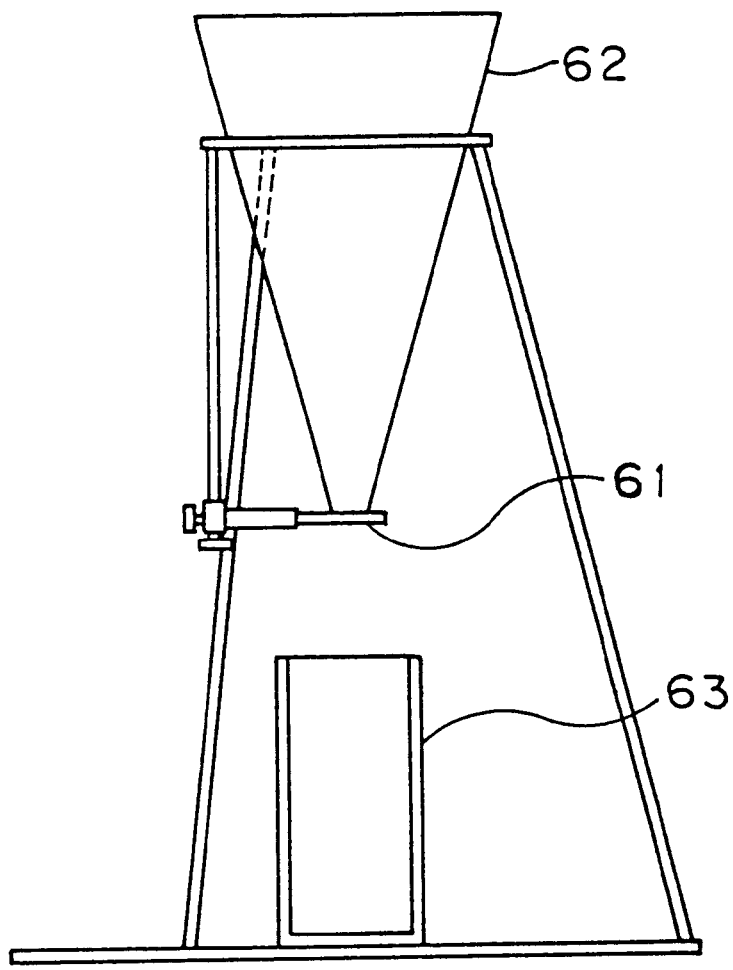
FIG. 7 is a schema of a bulk density measurement apparatus.

(Bulk Density):

This was measured according to JIS K3362 with a bulk density meter (made by Kuramochi Scientific Instrument Seisakusho K.K.) of FIG. 7.

An amount of 120 g of sample (water-absorbent resin particles), which had been well-mixed to eliminate the unevenness according to the particle diameter, was placed into a funnel 62 with its damper 61 closed. Immediately thereafter, the damper 61 was opened to drop the sample into a receiver 63. A portion of the sample, standing above the brim of the receiver, was scraped off with a glass rod. Then, the weight of the receiver containing the sample was measured with an accuracy of 0.1 g to calculate a bulk density in accordance with the below-mentioned equation. Incidentally, the bulk density was measured under conditions where the solid content of the water-absorbent resin powder (based on the moisture content) was not lower than 95 weight %, and where the temperature was 25±2° C., and where the relative humidity was in the range of 30~50%.

Incidentally, in the case where the solid content (based on the moisture content) of the water-absorbent resin powder is lower than 95 weight %, it is preferable that the measurement is carried out after the water-absorbent resin powder has been dried preferably under vacuum in a wind-free drying oven of 60° C. to increase the solid content (based on the moisture content) to not lower than 95 weight %.

$$S=(C-A)/B$$

where S: bulk density (g/ml)
A: weight (g) of the receiver
B: capacity of the receiver (100 ml)
C: weight (g) of the receiver when containing the sample (Specific Surface Area):

The specific surface area of the water-absorbent resin powder was determined by the "B.E.T. (Brunauer-Emmett-Teller) single-point method." "Analyte full automatic specific surface area measurement apparatus 4-Sorb U1" (made by Yuasa Ionics Co., Ltd.) was used as the measurement apparatus. First of all, about 5 g of water-absorbent resin powder (of which the sample comprised particles as beforehand obtained by classification into the range of 850~212 μm or 850~150 μm with sieves) was placed into a microcell (TYPE: QS400) of about 13 cm$^3$ in capacity, and the microcell containing the sample was heated to 150° C. under a nitrogen gas current to degas and dehydrate the sample sufficiently. Next, the microcell containing the sample was cooled to −200° C. under a mixed-gas current including helium gas and 0.1% krypton gas, and the sample was allowed to adsorb the mixed gas until equilibrium was established. Thereafter, the temperature of the microcell containing the sample was reverted to room temperature, and the mixed gas was eliminated from the sample to determine the specific surface area of the water-absorbent resin powder from the amount of the krypton-mixed gas as eliminated. Incidentally, the adsorption-elimination step of the microcell containing the sample was carried out 3 times to determine the specific surface area (m$^2$/g) of the water-absorbent resin powder from the average amount.

(Weight-average Particle Diameter):

The particle diameter distribution of particles, as obtained by beforehand classifying the water-absorbent resin powder into the range of 850~212 μm or 850~150 μm with sieves (their mesh opening sizes were, for example, 600 μm, 500 μm, 425 μm, 300 μm, 212 μm, 150 μm, 106 μm respectively), was plotted on logarithmic probability paper, from which the weight-average particle diameter (D50) was read.

(Water Content (Solid Content)):

An amount of 1,000 g of water-absorbent resin powder was placed into an aluminum cup having an inner diameter of 52 mm and then dried by heating in a wind-free drying oven of 105° C. for 3 hours. The weight loss (g) on drying of the powder was regarded as water to determine the water content (weight %) (and calculate therefrom the solid content (weight %)).

(Evaluation of Color of Water-absorbent Resin Powder):

The surface color of the water-absorbent resin powder was measured in terms of L value in lightness (lightness index) and a value and b value both in chromaticity (chromaticness index) of the water-absorbent resin powder under set conditions (reflection measurement/appendix powder-paste sample stand (30 mmφ)/standard round white board No. 2/30Φ projector pipe for powder-paste as the standard) using a spectroscopic color difference meter (SZ-→80 COLOR MEASURING SYSTEM) made by Nippon Denshoku Kogyo Co., Ltd.

(Absorption Rate of Absorbent Structure: Core Acquisition):

First, 11.4 g of water-absorbent resin powder and 6.2 g of wood pulp were mixed together in a dry manner with a mixer. Next, the resultant mixture was shaped into a web of the size of 260 mm×150 mm. Thus, an absorbent structure (having a water-absorbent resin powder content of 65 weight %) was prepared.

On the other hand, artificial urine (2) having the composition of urea 1.9 weight %, NaCl 0.8 weight %, $CaCl_2$ 0.1 weight %, and $MgSO_4$ 0.1 weight % (the balance was water) was prepared.

A load of 18 g/cm$^2$ was uniformly applied to the whole absorbent structure as above, and further, a cylinder having a diameter of 30 mm and a height of 120 mm was pressed onto a central portion of this absorbent structure to allow the cylinder to stand vertically. Next, 50 g of artificial urine (2) of 25° C. was poured into the cylinder quickly (at one stroke). Then, a period of time, in which the artificial urine (2) in the cylinder was entirely absorbed from the central portion into the whole absorbent structure since the above artificial urine (2) began to be poured, was measured and regarded as the first-time absorption rate (second). Thereafter, the absorbent structure which had been used for the above measurement was used to repeat the same measurement two times at intervals of 50 minutes, thus measuring the second-time absorption rate (second) and the third-time absorption rate (second).

The faster these absorption rates are (in other words, the shorter the above period of time by the second is), the higher the liquid diffusibility of the absorbent structure can be evaluated.

(Evaluation of Performance of Absorbent Article: (Kewpie (trademark) Doll Test)):

Sixty-five weight parts of water-absorbent resin powder and 35 weight parts of wood pulp were mixed together in a dry manner with a mixer. The resultant mixture was shaped into a web of the size of 120 mm×400 mm by pneumatically molding the mixture on a wire screen of 400 mesh (mesh opening size: 38 μm) with a batch type pneumatic molding device. Then, this web was pressed under a pressure of 2 kg/cm$^2$ for 5 seconds, thus obtaining an absorbent structure having a basis weight of about 0.047 g/cm$^2$ (water-absorbent resin powder content: 65 weight %).

Next, a back sheet (liquid-impermeable sheet) of a liquid-impermeable polypropylene with a so-called leg gather, the above absorbent structure, and a top sheet (liquid-permeable sheet) of a liquid-permeable polypropylene were attached to each other in this order with double coated tapes, and two so-called tape fasteners were then provided to the resultant attached product, thus obtaining an absorbent article (diaper).

This absorbent article was fitted up to a so-called Kewpie (trademark) doll (body length: 55 cm, weight: 5 kg), and this doll was laid on its face. Thereafter, a tube was inserted between the absorbent article and the doll to inject 50 g of 0.9 weight % physiological saline every 20 minutes into a position corresponding to where urine was discharged from a human body. Then, this injection operation was ended when the injected physiological saline began leaking without being absorbed by the absorbent article, and the total amount (g) of the physiological saline, which had been injected until then, was measured.

The above measurement was repeated four times, and the average of the resultant four measured values was determined and regarded as the absorption quantity (g). The larger absorption quantity was evaluated as the better performance of the absorbent article.

(Extractable Content):

An amount of 0.5 g of water-absorbent resin powder was dispersed into 1,000 ml of deionized (ion-exchanged) water, and the resultant mixture was stirred for 16 hours. The resultant swollen gel was filtered with filter paper, and then the extractable content (weight % relative to the water-absorbent resin powder) of the water-absorbent resin powder was determined by colloidal titration of water-soluble polymers in the resultant filtrate, that is, extractable components which had eluted from the water-absorbent resin powder.

REFERENTIAL EXAMPLE 1

In a reaction vessel as prepared by capping a jacketed stainless double-arm type kneader of 10 liters in capacity having two sigmoidal vanes, 2.4 g of ammonium persulfate and 0.12 g of L-ascorbic acid were added to a reaction solution under stirred conditions, wherein the reaction solution was prepared by dissolving 2.50 g of polyethylene glycol diacrylate into 5,500 g of an aqueous solution of sodium acrylate having a neutralization ratio of 75 mol % (monomer concentration: 33 weight %). As a result, about 1 minute after, a polymerization reaction started. Then, while the resultant gel is crushed, the polymerization reaction was carried out in the range of 30–80° C., and the resultant hydrogelled crosslinked polymer (1) was got out 60 minutes after the initiation of the polymerization reaction.

The resultant hydrogelled crosslinked polymer (1) had a finely divided diameter of about 5 mm. This finely divided hydrogelled crosslinked polymer (1) was spread onto a wire gauze of 50 mesh (mesh opening size: 300 μm) and then dried at 150° C. with hot air for 90 minutes to obtain a water-absorbent resin (A) which was a crosslinked polymer.

REFERENTIAL EXAMPLE 2

In a reaction vessel as prepared by fitting a stainless vat with a thermometer and a cap, 3.24 g of 5 weight % aqueous sodium persulfate solution, 2.92 g of 0.5 weight % aqueous L-ascorbic acid solution, 3.24 g of 5 weight % aqueous 2,2'-azobis(2-amidinopropane) dihydrochloride (trade name: V-50, made by Wako Pure Chemical Industries, Ltd.) solution, and 3.34 g of 0.35 weight % aqueous hydrogen peroxide solution were added to a reaction solution under stirred conditions, wherein the reaction solution was prepared by dissolving 1.97 g of polyethylene glycol diacrylate into 2,000 g of an aqueous solution of sodium acrylate having a neutralization ratio of 65 mol % (monomer concentration: 35 weight %), and the reaction solution was degassed with nitrogen. As a result, about 1 minute after, a polymerization reaction started. Then, the polymerization reaction was carried out while the lower face of the reaction vessel was cooled to 10° C., with the result that the reaction system reached the peak temperature (82° C.) of the heat generation in 10 minutes after the initiation of the polymerization reaction. Then, after heating the lower face of the reaction vessel at 60° C. for 20 minutes, the resultant hydrogelled crosslinked polymer (2) was got out.

The resultant hydrogelled crosslinked polymer (2) was crushed with a meat chopper (two blades, die diameter=9.5 mm, made by Hiraga Seisakusho Co., Ltd.) such that the gel would have a diameter of not greater than about 5 mm. This crushed hydrogelled crosslinked polymer (2) was spread onto a wire gauze of 50 mesh (mesh opening size: 300 μm) and then dried at 170° C. with hot air for 40 minutes to obtain a water-absorbent resin (B) which was a crosslinked polymer.

REFERENTIAL EXAMPLE 3

In a reaction vessel as prepared by fitting a stainless vat with a thermometer and a cap, 5.33 g of 20 weight % aqueous sodium persulfate solution and 3.20 g of 0.5 weight % aqueous L-ascorbic acid solution were added to a reaction solution under stirred conditions, wherein the reaction solution was prepared by dissolving 4.33 g of polyethylene glycol diacrylate into 2,000 g of an aqueous solution of sodium acrylate having a neutralization ratio of 70 mol % (monomer concentration: 39 weight %), and the reaction solution was degassed with nitrogen. As a result, about 4 minutes after, a polymerization reaction started. Then, the polymerization reaction was carried out while the lower face of the reaction vessel was cooled to 15° C., with the result that the reaction system reached the peak temperature (93° C.) of the heat generation in 16 minutes after the initiation of the polymerization reaction. Then, after heating the lower face of the reaction vessel at 80° C. for 20 minutes, the resultant hydrogelled crosslinked polymer (3) was got out.

The resultant hydrogelled crosslinked polymer (3) was crushed with a meat chopper (two blades, die diameter=16 mm, made by Hiraga Seisakusho Co., Ltd.) such that the gel would have a diameter of not greater than about 5 mm. This crushed hydrogelled crosslinked polymer (3) was spread onto a wire gauze of 50 mesh (mesh opening size: 300 μm) and then dried at 170° C. with hot air for 40 minutes to obtain a water-absorbent resin (C) which was a crosslinked polymer.

EXAMPLE 1

The water-absorbent resin (A), which was a crosslinked polymer as obtained in Referential Example 1, was pulverized with a hammer mill (rooster (grate): diameter of opening=3 mm), and 150 g of the pulverized water-absorbent resin was placed into a homogenizer (high-speed homogenizer, Model: MX-7, made by Nihonseiki Kaisha Ltd.) and then ground at 6,000 rpm for about 1 hour. The resultant water-absorbent resin was sieved with JIS standard sieves (mesh opening sizes=850 μm and 212 μm) to classify the resin into particle diameters of 850~212 μm. The water absorption capacity under no load, the extractable content, the bulk density, and the average particle diameter of the resultant arbitrarily pulverized water-absorbent resin powder (1) were measured, and results thereof are shown in Table 1. In addition, an electron micrograph showing the particle structure of the resultant arbitrarily pulverized water-absorbent resin powder (1) is FIG. 8.

EXAMPLE 2

The water-absorbent resin (A), which was a crosslinked polymer as obtained in Referential Example 1, was pulverized with a roll granulator (Model: GRN 1041, made by Nippon Granulator Co., Ltd.), and 150 g of the pulverized water-absorbent resin was placed into a homogenizer (high-speed homogenizer, Model: MX-7, made by Nihonseiki Kaisha Ltd.) and then ground at 6,000 rpm for 25 minutes. The resultant water-absorbent resin was sieved with JIS standard sieves (mesh opening sizes=850 μm and 212 μm) to classify the resin into particle diameters of 850~212 μm. The water absorption capacity under no load, the extractable content, the bulk density, and the average particle diameter of the resultant arbitrarily pulverized water-absorbent resin powder (2) were measured, and results thereof are shown in Table 1.

EXAMPLE 3

The water-absorbent resin (B), which was a crosslinked polymer as obtained in Referential Example 2, was disintegrated by hand, and 150 g of the pulverized water-absorbent resin was placed into a homogenizer (high-speed homogenizer, Model: MX-7, made by Nihonseiki Kaisha Ltd.) and then ground at 6,000 rpm for about 1 hour. The resultant water-absorbent resin was sieved with JIS standard sieves (mesh opening sizes 850 μm and 212 μm) to classify the resin into particle diameters of 850~212 μm. The water absorption capacity under no load, the extractable content, the bulk density, and the average particle diameter of the resultant arbitrarily pulverized water-absorbent resin powder (3) were measured, and results thereof are shown in Table 1.

EXAMPLE 4

The water-absorbent resin (B), which was a crosslinked polymer as obtained in Referential Example 2, was disintegrated by hand, and 150 g of the pulverized water-absorbent resin was placed into a homogenizer (high-speed homogenizer, Model: MX-7, made by Nihonseiki Kaisha Ltd.) and then ground at 6,000 rpm for about 15 minutes. The resultant water-absorbent resin was sieved with JIS standard sieves (mesh opening sizes=850 μm and 212 μm) to classify the resin into particle diameters of 850~212 μm. The water absorption capacity under no load, the extractable content, the bulk density, and the average particle diameter of the resultant arbitrarily pulverized water-absorbent resin powder (4) were measured, and results thereof are shown in Table 1.

EXAMPLE 5

The water-absorbent resin (C), which was a crosslinked polymer as obtained in Referential Example 3, was pulverized with a hammer mill (rooster (grate): diameter of opening=3 mm), and 180 g of the pulverized water-absorbent resin was placed into a homogenizer (high-speed homogenizer, Model: MX-7, made by Nihonseiki Kaisha Ltd.) and then ground at 6,000 rpm for about 1.5 hours. The resultant water-absorbent resin was sieved with JIS standard sieves (mesh opening sizes=850 μm and 212 μm) to classify the resin into particle diameters of 850~212 μm. The water absorption capacity under no load, the extractable content, the bulk density, and the average particle diameter of the resultant arbitrarily pulverized water-absorbent resin powder (5) were measured, and results thereof are shown in Table 1. In addition, the specific surface area of the resultant arbitrarily pulverized water-absorbent resin powder (5) was measured, with the result that it was 0.011 $m^2/g$.

COMPARATIVE EXAMPLE 1

The water-absorbent resin (A), which was a crosslinked polymer as obtained in Referential Example 1, was pulverized with a hammer mill (rooster (grate): diameter of opening=3 mm), and the resultant water-absorbent resin was sieved with JIS standard sieves (mesh opening sizes=850 μm and 212 μm) to classify the resin into particle diameters of 850~212 μm. The water absorption capacity under no load, the extractable content, the bulk density, and the average particle diameter of the resultant comparative arbitrarily pulverized water-absorbent resin powder (1) were measured, and results thereof are shown in Table 1. In addition, an electron micrograph showing the particle structure of the resultant comparative arbitrarily pulverized water-absorbent resin powder (1) is FIG. 9.

COMPARATIVE EXAMPLE 2

The water-absorbent resin (B), which was a crosslinked polymer as obtained in Referential Example 2, was pulverized with a hammer mill (rooster (grate): diameter of opening=3 mm), and the resultant water-absorbent resin was sieved with JIS standard sieves (mesh opening sizes=850 μm and 212 μm) to classify the resin into particle diameters of 850~212 μm. The water absorption capacity under no load, the extractable content, the bulk density, and the average particle diameter of the resultant comparative arbitrarily pulverized water-absorbent resin powder (2) were measured, and results thereof are shown in Table 1.

COMPARATIVE EXAMPLE 3

The water-absorbent resin (C), which was a crosslinked polymer as obtained in Referential Example 3, was pulverized with a hammer mill (rooster (grate): diameter of opening=3 mm), and the resultant water-absorbent resin was sieved with JIS standard sieves (mesh opening sizes=850 μm and 212 μm) to classify the resin into particle diameters of 850~212 μm. The water absorption capacity under no load, the extractable content, the bulk density, and the average particle diameter of the resultant comparative arbitrarily pulverized water-absorbent resin powder (3) were measured, and results thereof are shown in Table 1. In addition, the specific surface area of the resultant comparative arbitrarily pulverized water-absorbent resin powder (3) was measured, with the result that it was 0.023 $m^2/g$.

1 hour, but the saturated values thereof were equal to each other, namely, 53 (g/g).

In addition, the specific surface area in Example 5 (bulk density=0.87 (g/ml) (which involves the step of grinding the water-absorbent resin (C)) has reduced to about half that in Comparative Example 3 (bulk density=0.64 (g/ml) (which involves no grinding) (0.023 ($m^2/g$) in Comparative Example 3 reduced to 0.011 ($m^2/g$) in Example 5), and further, the extractable content in Example 5 also has reduced to lower than that in Comparative Example 3.

EXAMPLE 6

A surface-crosslinking agent, comprising 0.03 weight parts of ethylene glycol diglycidyl ether, 1 weight part of propylene glycol, 3 weight parts of water, and 1 weight part of 2-propanol, was mixed with 100 weight parts of the arbitrarily pulverized water-absorbent resin powder (1) as obtained in Example 1. The resultant mixture was subjected to a heat treatment at 185° C. for 30 minutes to obtain an arbitrarily pulverized water-absorbent resin powder (6). The water absorption capacity under no load, the water absorption capacity under a load, the liquid permeation amount under a load, the solid content, and the bulk density of the resultant arbitrarily pulverized water-absorbent resin powder (6) were measured, and results thereof are shown in Table 2.

TABLE 1

-Physical properties before surface crosslinking-

| | Water-absorbent resin before pulverization or grinding | Water absorption capacity under no load (g/g) | Extractable content (weight %) | Bulk density (g/ml) | Average particle diameter (μm) |
|---|---|---|---|---|---|
| Example 1 | (A) | 45 | 13 | 0.83 | 440 |
| Example 2 | (A) | 45 | 14 | 0.77 | 460 |
| Example 3 | (B) | 48 | 8.3 | 0.87 | 430 |
| Example 4 | (B) | 50 | 10 | 0.73 | 480 |
| Example 5 | (C) | 31 | 9.1 | 0.87 | 440 |
| Comparative Example 1 | (A) | 46 | 15 | 0.66 | 520 |
| Comparative Example 2 | (B) | 53 | 11 | 0.66 | 550 |
| Comparative Example 3 | (C) | 31 | 9.7 | 0.64 | 560 |

Examples 1~5: involving the grinding step.
Comparative Examples 1~3: not involving the grinding step.

Table 1 shows the comparison of the physical properties before surface crosslinking. The extractable contents in Example 1 (bulk density=0.83 (g/ml) and Example 2 (bulk density=0.77 (g/ml) (both of which involve the step of grinding the water-absorbent resin (A)) have reduced to lower than that in Comparative Example 1 (bulk density= 0.66 (g/ml) (which involves no grinding). Incidentally, the above water absorption capacities under no load in these examples and comparative example are values as given by the immersion for 1 hour, but the saturated values thereof were equal to each other, namely, 46 (g/g).

In addition, similarly, the extractable contents in Example 3 (bulk density=0.87 (g/ml) and Example 4 (bulk density= 0.73 (g/ml) (both of which involve the step of grinding the water-absorbent resin (B)) have reduced to lower than that in Comparative Example 2 (bulk density=0.66 (g/ml) (which involves no grinding). Incidentally, the above water absorption capacities under no load in these examples and comparative example are values as given by the immersion for

EXAMPLE 7

A surface-crosslinking agent, comprising 0.03 weight parts of ethylene glycol diglycidyl ether, 1 weight part of propylene glycol, 3 weight parts of water, and 1 weight part of 2-propanol, was mixed with 100 weight parts of the arbitrarily pulverized water-absorbent resin powder (2) as obtained in Example 2. The resultant mixture was subjected to a heat treatment at 185° C. for 30 minutes to obtain an arbitrarily pulverized water-absorbent resin powder (7). The water absorption capacity under no load, the water absorption capacity under a load, the liquid permeation amount under a load, the solid content, and the bulk density of the resultant arbitrarily pulverized water-absorbent resin powder (7) were measured, and results thereof are shown in Table 2.

EXAMPLE 8

A surface-crosslinking agent, comprising 0.03 weight parts of ethylene glycol diglycidyl ether, 1 weight part of propylene glycol, 3 weight parts of water, and 1 weight part of 2-propanol, was mixed with 100 weight parts of the arbitrarily pulverized water-absorbent resin powder (3) as obtained in Example 3. The resultant mixture was subjected to a heat treatment at 185° C. for 30 minutes to obtain an arbitrarily pulverized water-absorbent resin powder (8). The water absorption capacity under no load, the water absorption capacity under a load, the liquid permeation amount under a load, the solid content, and the bulk density of the resultant arbitrarily pulverized water-absorbent resin powder (8) were measured, and results thereof are shown in Table 2.

EXAMPLE 9

A surface-crosslinking agent, comprising 0.03 weight parts of ethylene glycol diglycidyl ether, 1 weight part of propylene glycol, 3 weight parts of water, and 1 weight part of 2-propanol, was mixed with 100 weight parts of the arbitrarily pulverized water-absorbent resin powder (4) as obtained in Example 4. The resultant mixture was subjected to a heat treatment at 185° C. for 30 minutes to obtain an arbitrarily pulverized water-absorbent resin powder (9). The water absorption capacity under no load, the water absorption capacity under a load, the liquid permeation amount under a load, the solid content, and the bulk density of the resultant arbitrarily pulverized water-absorbent resin powder (9) were measured, and results thereof are shown in Table 2.

EXAMPLE 10

A surface-crosslinking agent, comprising 1 weight part of 1,4-butanediol, 3 weight parts of water, and 1 weight part of 2-propanol, was mixed with 100 weight parts of the arbitrarily pulverized water-absorbent resin powder (5) as obtained in Example 5. The resultant mixture was subjected to a heat treatment at 195° C. for 25 minutes to obtain an arbitrarily pulverized water-absorbent resin powder (10). The water absorption capacity under no load, the water absorption capacity under a load, the liquid permeation amount under a load, the solid content, and the bulk density of the resultant arbitrarily pulverized water-absorbent resin powder (10) were measured, and results thereof are shown in Table 2.

COMPARATIVE EXAMPLE 4

A surface-crosslinking agent, comprising 0.03 weight parts of ethylene glycol diglycidyl ether, 1 weight part of propylene glycol, 3 weight parts of water, and 1 weight part of 2-propanol, was mixed with 100 weight parts of the comparative arbitrarily pulverized water-absorbent resin powder (1) as obtained in Comparative Example 1. The resultant mixture was subjected to a heat treatment at 185° C. for 30 minutes to obtain a comparative arbitrarily pulverized water-absorbent resin powder (4). The water absorption capacity under no load, the water absorption capacity under a load, the liquid permeation amount under a load, the solid content, and the bulk density of the resultant comparative arbitrarily pulverized water-absorbent resin powder (4) were measured, and results thereof are shown in Table 2.

COMPARATIVE EXAMPLE 5

A surface-crosslinking agent, comprising 0.03 weight parts of ethylene glycol diglycidyl ether, 1 weight part of propylene glycol, 3 weight parts of water, and 1 weight part of 2-propanol, was mixed with 100 weight parts of the comparative arbitrarily pulverized water-absorbent resin powder (2) as obtained in Comparative Example 2. The resultant mixture was subjected to a heat treatment at 185° C. for 30 minutes to obtain a comparative arbitrarily pulverized water-absorbent resin powder (5). The water absorption capacity under no load, the water absorption capacity under a load, the liquid permeation amount under a load, the solid content, and the bulk density of the resultant comparative arbitrarily pulverized water-absorbent resin powder (5) were measured, and results thereof are shown in Table 2.

COMPARATIVE EXAMPLE 6

A surface-crosslinking agent, comprising 1 weight part of 1,4-butanediol, 3 weight parts of water, and 1 weight part of 2-propanol, was mixed with 100 weight parts of the comparative arbitrarily pulverized water-absorbent resin powder (3) as obtained in Comparative Example 3. The resultant mixture was subjected to a heat treatment at 195° C. for 25 minutes to obtain a comparative arbitrarily pulverized water-absorbent resin powder (6). The water absorption capacity under no load, the water absorption capacity under a load, the liquid permeation amount under a load, the solid content, and the bulk density of the resultant comparative arbitrarily pulverized water-absorbent resin powder (6) were measured, and results thereof are shown in Table 2.

TABLE 2

| | Water-absorbent resin before pulverization or grinding | Water absorption capacity under no load (g/g) | Water absorption capacity under load (g/g) | Liquid permeation amount under load (g) | Solid content (weight %) | Bulk density (g/ml) |
|---|---|---|---|---|---|---|
| Example 6 | (A) | 39 | 24 | 375 | 98 | 0.83 |
| Example 7 | (A) | 39 | 24 | 362 | 98 | 0.77 |
| Example 8 | (B) | 47 | 27 | 519 | 98 | 0.86 |
| Example 9 | (B) | 47 | 30 | 353 | 98 | 0.75 |
| Example 10 | (C) | 27 | 26 | 1081 | 98 | 0.85 |
| Comparative Example 4 | (A) | 42 | 25 | 175 | 98 | 0.68 |
| Comparative Example 5 | (B) | 46 | 29 | 260 | 98 | 0.67 |

TABLE 2-continued

| | -Physical properties after surface crosslinking- | | | | |
|---|---|---|---|---|---|
| | Water-absorbent resin before pulverization or grinding | Water absorption capacity under no load (g/g) | Water absorption capacity under load (g/g) | Liquid permeation amount under load (g) | Solid content (weight %) | Bulk density (g/ml) |
| Comparative Example 6 | (C) | 27 | 26 | 1009 | 98 | 0.64 |

Examples 6~10: involving the grinding step.
Comparative Examples 4~6: not involving the grinding step.

Table 2 shows the comparison of the physical properties after surface crosslinking. The liquid permeation amounts under load in Example 6 (bulk density=0.83 (g/ml) and Example 7 (bulk density=0.77 (g/ml) (both of which involve the step of grinding the water-absorbent resin (A)) have increased to more than two times that in Comparative Example 4 (bulk density=0.68 (g/ml) (which involves no grinding). In addition, the liquid permeation amounts under load in Example 8 (bulk density=0.86 (g/ml) and Example 9 (bulk density=0.75 (g/ml) (both of which involve the step of grinding the water-absorbent resin (B)) have increased to about two times that in Comparative Example 5 (bulk density=0.67 (g/ml) (which involves no grinding). Furthermore, the liquid permeation amount under load in Example 10 (bulk density=0.85 (g/ml) (which involves the step of grinding the water-absorbent resin (C)) has increased by 72 (g) as compared with that in Comparative Example 6 (bulk density=0.64 (g/ml) (which involves no grinding).

COMPARATIVE EXAMPLE 7

A surface-crosslinking agent, comprising 0.015 weight parts of ethylene glycol diglycidyl ether, 0.5 weight parts of propylene glycol, 1.5 weight parts of water, and 0.45 weight parts of 2-propanol, was mixed with 100 weight parts of the comparative arbitrarily pulverized water-absorbent resin powder (1) as obtained in Comparative Example 1. The resultant mixture was subjected to a heat treatment at 180° C. for 15 minutes to obtain a comparative arbitrarily pulverized water-absorbent resin powder (7). The water absorption capacity under no load, the water absorption capacity under a load, the liquid permeation amount under a load, the solid content, and the bulk density of the resultant comparative arbitrarily pulverized water-absorbent resin powder (7) were measured. Particularly, the water absorption capacity under a load was measured with two kinds of loads (0.3 psi and 0.7 psi). Results thereof are shown in Table 3.

(g/g) under a load of 0.3 psi (2.07 kPa), but reduced to 12 (g/g) under a load of 0.7 psi (4.83 kPa). Therefrom it was found that the liquid permeability under a load greatly deteriorated in Comparative Example 7 when compared with Example 6 (Example 6=375 (g), Comparative Example 7=40 (g)).

EXAMPLES 11~15 AND COMPARATIVE EXAMPLES 8~10

The mechanical damage test was carried out for each of the water-absorbent resin powders as obtained in Examples 6~10 and Comparative Examples 4~6. Results thereof are shown in Table 4.

TABLE 4

| | Physical properties after mechanical damage test | | | |
|---|---|---|---|---|
| | Water-absorbent resin before pulverization or grinding | Water absorption capacity under no load (g/g) | Water absorption capacity under load (g/g) | Liquid permeation amount under load (g) |
| Example 11 | (A) | 40 (39) | 24 (24) | 382 (375) |
| Example 12 | (A) | 39 (39) | 24 (24) | 358 (362) |
| Example 13 | (B) | 48 (47) | 28 (27) | 519 (519) |
| Example 14 | (B) | 46 (47) | 29 (30) | 317 (353) |
| Example 15 | (C) | 27 (27) | 26 (26) | 1081 (1081) |
| Comparative Example 8 | (A) | 41 (42) | 19 (25) | 158 (175) |
| Comparative Example 9 | (B) | 47 (46) | 26 (29) | 224 (260) |
| Comparative Example 10 | (C) | 27 (27) | 25 (26) | 865 (1009) |

The values in the parentheses are those before mechanical damage test (see Table 2). Examples 11–15: involving the grinding step. Comparative Examples 8–10: not involving the grinding step.

Table 4 shows the results of the mechanical damage test as carried out after the surface crosslinking. From the

TABLE 3

| | Water absorbent resin before pulverization or grinding | Water absorption capacity under no load (g/g) | Water absorption Water absorption capacity under load (g/g) | | Liquid permeation amount under load (g) | Solid content (weight %) | Bulk density (g/ml) |
|---|---|---|---|---|---|---|---|
| | | | 0.3 psi | 0.7 psi | | | |
| Comparative Example 7 | (A) | 43 | 33 | 12 | 40 | 98 | 0.67 |

As to the comparative arbitrarily pulverized water-absorbent resin powder (7) of Comparative Example 7 (bulk density=0.67 (g/ml), the water absorption capacity was 33 comparison with Table 2 showing the results as obtained before applying the impact, it would be understood that the arbitrarily pulverized water-absorbent resin powders (6)~(10) according to the present invention, which have a bulk density of not lower than 0.74 (g/ml), undergo little or no deterioration of the physical properties even if they are given the mechanical damage. In comparison therewith, the comparative arbitrarily pulverized water-absorbent resin powders (4)~(6), which have a bulk density of lower than 0.74 (g/ml), undergo great reduction of the water absorption capacity under a load or the liquid permeation amount under a load due to the mechanical damage. Thus, the arbitrarily pulverized water-absorbent resin powder according to the present invention is excellent in that it undergoes little deterioration of the physical properties during the production process therefor, or during the transportation thereafter, or during the production of absorbent articles.

EXAMPLE 16 AND COMPARATIVE EXAMPLE 11

The measurement of the absorption rate (core acquisition) of the absorbent structure and the evaluation of the performance of the absorbent article (Kewpie (trademark) doll test) were carried out for each of the water-absorbent resin powders as obtained in Example 6 and Comparative Example 4. The methods for these measurement and evaluation are as aforementioned. Results thereof are shown in Table 5.

TABLE 5

Evaluation of performance of absorbent structures and articles

| | Absorbent structure Absorption rate (second) | | | Absorbent article Absorption |
| --- | --- | --- | --- | --- |
| | First time | Second time | Third time | quantity (g) |
| Example 16 | 44 | 52 | 82 | 300 |
| Comparative Example 11 | 46 | 111 | 169 | 250 |

Table 5 shows the results of evaluation of performance of absorbent structures and absorbent articles (diapers). As is evident therefrom, as to the absorbent structure using the arbitrarily pulverized water-absorbent resin powder (6) of Example 6 when compared with that using the comparative arbitrarily pulverized water-absorbent resin powder (4) of Comparative Example 4, the periods of time by the second as needed particularly for the second- and third-time liquid absorptions are both shortened to less than half, therefore the absorption rate of the absorbent structure is greatly enhanced. In addition, as to the absorbent article (diaper) using the arbitrarily pulverized water-absorbent resin powder (6) of Example 6 when compared with that using the comparative arbitrarily pulverized water-absorbent resin powder (4) of Comparative Example 4, the total absorption quantity (g) of the absorbent article is also improved.

EXAMPLE 17

The color was evaluated for the arbitrarily pulverized water-absorbent resin powders (6)~(10) of Examples 6~10. As a result, any water-absorbent resin powder exhibited an L value of not lower than 85 (namely, L value=about 88), an a value in the range of ±2 (namely, a value=about −0.6), and a b value in the range of 0~9 (namely, b value=about 6).

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An arbitrarily pulverized water-absorbent resin powder, which has a bulk density of not lower than 0.74 (g/ml) and a water absorption capacity of not lower than 20 (g/g) for 0.9 weight % physiological saline under a load of 0.7 psi (4.83 kPa).

2. An arbitrarily pulverized water-absorbent resin powder according to claim 1, wherein the bulk density is not lower than 0.76 (g/ml).

3. An arbitrarily pulverized water-absorbent resin powder according to claim 1, of which the neighborhood of the surface is crosslinked.

4. An arbitrarily pulverized water-absorbent resin powder according to claim 3, of which the neighborhood of the surface is crosslinked with a surface-crosslinking agent that includes a polyhydric alcohol.

5. An absorbent structure, which comprises the arbitrarily pulverized water-absorbent resin powder as recited in claim 1 and a fibrous material.

6. An absorbent article, which comprises an absorbent layer including the absorbent structure as recited in claim 5.

7. An absorbent article, which is a diaper that comprises an absorbent layer including the absorbent structure as recited in claim 5, wherein the absorbent structure has an arbitrarily pulverized water-absorbent resin powder content of not lower than 30 weight %.

8. An arbitrarily pulverized water-absorbent resin powder according to claim 1, wherein said resin powder is a crosslinked polymer, the main component of which is a polymer obtained by polymerizing and crosslinking monomers of which the main component is acrylic acid and/or its salt (neutralized product), and where said water absorption capacity is measured under load over a period of 60 minutes.

9. An arbitrarily pulverized water-absorbent resin powder according to claim 1, wherein said bulk density is measured using an apparatus according to JIS K 3362.

10. An arbitrarily pulverized water-absorbent resin powder according to claim 1, wherein said resin powder is produced by a process comprising the step of grinding water-absorbent crosslinked particles to reduce the specific surface area of said crosslinked particles to obtain said bulk density of not lower than 0.74 g/ml.

11. An arbitrarily pulverized water-absorbent resin powder according to claim 10, wherein said process further comprises producing said water-absorbent resin powder by aqueous solution polymerization.

12. An arbitrarily pulverized water-absorbent resin powder according to claim 10, comprising pulverizing said crosslinked polymer particles simultaneously with said grinding step.

13. An arbitrarily pulverized water-absorbent resin powder according to claim 10, wherein said grinding step smoothes the surfaces of said crosslinked particles, reduces the specific surface area of said particles and increases the bulk density of said powder.

14. An arbitrarily pulverized water-absorbent resin powder according to claim 13, wherein said process comprises separating fine powders obtained by said grinding step to produce said resin powder having said bulk density of not less than 0.74 g/ml.

15. An arbitrarily pulverized water-absorbent resin powder according to claim 14, wherein said fine powders separated from said resin powder have a particle size of not greater than 100 $\mu$m.

16. An arbitrarily pulverized water-absorbent resin powder according to claim 14, wherein said process comprises separating not less than 50 wt % of said fine powder from said resin powder.

17. A production process for an arbitrarily pulverized water-absorbent resin powder, which comprises the step of obtaining water-absorbent crosslinked polymer particles by way of an aqueous solution polymerization step, with the process being characterized by further comprising the step of grinding and pulverization of the resultant crosslinked polymer particles until the bulk density thereof increases to not lower than 0.72 (g/ml), wherein said bulk density is measured by an apparatus according to JIS K 3362 and said pulverization is carried out simultaneously with said grinding.

18. A production process according to claim 17, wherein the grinding step is carried out under conditions where the specific surface area of the crosslinked polymer particles can be reduced.

19. A production process according to claim 17, which further comprises the step of removing fine powders which are generated in the grinding step.

20. A production process for an arbitrarily pulverized water-absorbent resin powder, which comprises the step of obtaining water-absorbent crosslinked polymer particles by way of an aqueous solution polymerization step, with the process being characterized by further comprising the step of grinding the resultant crosslinked polymer particles until the bulk density thereof measured by an apparatus according to JIS K 3362 increases to not lower than 0.72 (g/ml) and where said process further comprises the step of crosslinking the neighborhood of the surface of the water-absorbent resin powder after the grinding step.

21. A production process according to claim 20, wherein the step of crosslinking the neighborhood of the surface of the water-absorbent resin powder involves the use of a surface-crosslinking agent that includes a polyhydric alcohol.

22. A production process according to claim 20, wherein the step of crosslinking the neighborhood of the surface of the water-absorbent resin powder is carried out until the water absorption capacity of the water-absorbent resin powder-for 0.9 weight % physiological saline under a load of 0.7 psi (4.83 kPa) increases to not lower than 20 (g/g).

23. An arbitrarily pulverized water-absorbent resin powder, which is a crosslinked polymer, the main component of which is a polymer obtained by polymerizing and crosslinking monomers of which the main component is acrylic acid and/or its salt (neutralized product), which has a bulk density measured by an apparatus according to JIS K 3362 of not lower than 0.74 (g/ml) and a water absorption capacity of not lower than 20 (g/g) for 0.9 weight % physiological saline under a load of 0.7 psi (4.83 kPa) over a period of 60 minutes.

* * * * *